(12) United States Patent
Lee et al.

(10) Patent No.: US 12,327,546 B2
(45) Date of Patent: Jun. 10, 2025

(54) COMPUTING DEVICE FOR PROVIDING DIALOGUES SERVICES

(71) Applicant: ActionPower Corp., Seoul (KR)

(72) Inventors: Jihwa Lee, Seoul (KR); Hongsik Jo, Seoul (KR)

(73) Assignee: ActionPower Corp., Seoul (KR)

( * ) Notice: Subject to any disclaimer, the term of this patent is extended or adjusted under 35 U.S.C. 154(b) by 381 days.

(21) Appl. No.: 17/885,274

(22) Filed: Aug. 10, 2022

(65) Prior Publication Data

US 2024/0054990 A1    Feb. 15, 2024

(51) Int. Cl.
*G10L 15/04*   (2013.01)
*G10L 21/04*   (2013.01)
*G10L 25/87*   (2013.01)

(52) U.S. Cl.
CPC .............. *G10L 15/04* (2013.01); *G10L 21/04* (2013.01); *G10L 25/87* (2013.01)

(58) Field of Classification Search
None
See application file for complete search history.

(56) References Cited

U.S. PATENT DOCUMENTS

| | | | |
|---|---|---|---|
| 8,954,323 B2 * | 2/2015 | Tsujikawa | G10L 21/0272 704/226 |
| 9,324,322 B1 * | 4/2016 | Torok | H04R 3/02 |
| 10,957,337 B2 * | 3/2021 | Chen | G10L 17/04 |
| 11,895,263 B2 * | 2/2024 | Tadesse | G10L 25/51 |
| 2011/0131042 A1 * | 6/2011 | Nagatomo | G10L 15/18 704/E15.001 |
| 2012/0232912 A1 * | 9/2012 | Tammi | G10L 19/022 704/502 |
| 2015/0012270 A1 * | 1/2015 | Reynolds | G10L 25/87 704/233 |
| 2016/0086599 A1 * | 3/2016 | Kurata | G10L 15/187 704/243 |
| 2017/0041556 A1 * | 2/2017 | Aiba | H04N 5/77 |
| 2017/0323643 A1 * | 11/2017 | Arslan | G10L 19/018 |
| 2018/0191912 A1 * | 7/2018 | Cartwright | H04L 65/403 |
| 2022/0115020 A1 * | 4/2022 | Bradley | G06F 3/0334 |
| 2022/0261201 A1 * | 8/2022 | Sasaki | G10L 25/63 |
| 2023/0005488 A1 * | 1/2023 | Hiroe | H04R 3/005 |
| 2023/0206928 A1 * | 6/2023 | Yeung | G10L 25/78 704/246 |
| 2024/0054990 A1 * | 2/2024 | Lee | G10L 21/04 |

FOREIGN PATENT DOCUMENTS

| | | | |
|---|---|---|---|
| JP | 2013105374 A | | 5/2013 |
| JP | 2017167318 A | * | 9/2017 |
| KR | 10-2008-0037402 A | | 4/2008 |
| KR | 10-1592518 B1 | | 2/2016 |
| KR | 10-2016-0060335 B1 | | 5/2017 |

* cited by examiner

*Primary Examiner* — Jonathan C Kim
(74) *Attorney, Agent, or Firm* — Seed IP Law Group LLP

(57) ABSTRACT

Disclosed is a computer program executable by one or more processors and stored in a computer-readable storage medium, the computer program causing the one or more processors to perform one or more operations below, the operations including: an operation of receiving first voice data from a first user terminal and receiving second voice data from a second user terminal; an operation of generating integrated voice data based on the first voice data and the second voice data; and an operation of generating the integrated voice data as a conversation record by using a voice recognition model.

17 Claims, 16 Drawing Sheets

COMPUTING DEVICE FOR PROVIDING DIALOGUES SERVICES

BACKGROUND

Technical Field

The present disclosure relates to a computing device for providing a conversation record service, and more particularly, to a computing device for providing a conversation record service based on a voice file including conversation contents between a plurality of users.

Description of the Related Art

Today, office workers frequently hold meetings with employees inside and outside the company. In the course of a meeting, writing minutes of the meeting contents is very helpful in terms of work efficiency of organizations and individuals. However, since a separate stenographer is required to write the minutes during the meeting, additional costs may occur, and the quality of the minutes may vary depending on the competency of the stenographer.

On the other hand, recently, market demand for artificial intelligence is increasing according to issues, such as AlphaGo, and artificial intelligence is rapidly evolving as the amount of information that can be processed increases with the development of computer technology. In addition, as artificial intelligence evolves at a rapid pace, the accuracy of voice recognition using artificial neural networks is increasing.

Accordingly, Korean Patent Application Laid-Open No. 10-2008-0037402 (Apr. 30, 2008) discloses a system for automatically writing minutes by separating speakers and converting a voice file into text through an algorithm that separates a plurality of speakers based on the frequency band for a voice file input through a single channel.

BRIEF SUMMARY

The present disclosure has been conceived in response to the foregoing background art, and has been made in an effort to provide a computing device for providing a conversation record service based on a voice file including conversation contents between a plurality of users.

In order to solve one or more technical problems in the prior art including the foregoing problems, an embodiment of the present disclosure discloses a computer program executable by one or more processors and stored in a computer-readable storage medium, the computer program causing the one or more processors to perform one or more operations below, the operations including: an operation of receiving first voice data from a first user terminal and receiving second voice data from a second user terminal; an operation of generating integrated voice data based the first voice data and the second voice data; and an operation of generating the integrated voice data as a conversation record by using a voice recognition model.

Alternatively, the operations may further include: an operation of dividing the first voice data into one or more first voice data sub-data based on an utterance section, and dividing the second voice data into one or more second voice data sub-data based on an utterance section; and an operation of identifying a start time point and an end time point of each of the first voice data sub-data and the second voice data sub-data.

Alternatively, the operation of identifying the start time point and the end time point of each of the first voice data sub-data and the second voice data sub-data may include at least one of: an operation of synchronizing the start time points and the end time points of the first voice data and the second voice data through network packet exchange between the first user terminal and the second user terminal; and an operation of synchronizing the start time points and the end time points of the first voice data and the second voice data based on similarity of the first voice data sub-data and the second voice data sub-data.

Alternatively, the operations may further include an operation of identifying an overlapping section based on a start time point and an end time point of each of the first voice data sub-data and the second voice data sub-data.

Alternatively, the operation of generating the integrated voice data based on the first voice data and the second voice data may include an operation of performing pre-processing on each voice data in order to increase a recognition rate of the integrated voice data, and the pre-processing may include at least one of standardization of a signal size included in each of one or more voice data or frequency filtering.

Alternatively, the operation of generating the integrated voice data based on the first voice data and the second voice data may include at least one of an operation of dividing a speaker based on a voice signal size of each of the first voice data and the second voice data; and an operation of dividing a speaker through a statistical acoustic model based on the first voice data and the second voice data.

Alternatively, the operation of generating the integrated voice data by dividing the speaker based on the voice signal size of each of the first voice data and the second voice data may include an operation of dividing a speaker by comparing voice signal sizes of a first voice data frame based on the first voice data and a second voice data frame based on the second voice data.

Alternatively, the operation of generating the integrated voice data by dividing the speaker through the statistical acoustic model may include at least one of an operation of dividing a speaker of a current time point frame based on speaker information of an adjacent frame and an operation of dividing the speaker based on a speaker utterance time ratio each of the first voice data and the second voice data.

Alternatively, the operation of dividing the speaker based on the speaker utterance time ratio of each of the first voice data and the second voice data may include: an operation of calculating an utterance time ratio for each speaker based on a speaker of a frame excluding an overlapping section to divide the speakers for the overlapping section when the overlapping section is identified; and an operation of dividing the speaker of the overlapping section based on an utterance time ratio for each speaker for a previous frame of an overlapping section frame when the overlapping section is identified.

Alternatively, when the operation of dividing the speaker of the overlapping section based on an utterance time ratio for each speaker for a previous frame of an overlapping section frame when the overlapping section is identified may be performed when the previous frame of the overlapping section frame is equal to or greater than a selected (or a predetermined) ratio of voice data.

Another embodiment of the present disclosure discloses a method for providing a conversation record service, the method including: a method of receiving first voice data from a first user terminal and receiving second voice data from a second user terminal; a method of generating integrated voice data based on the first voice data and the second voice data; and a method of generating the integrated voice data as a conversation record by using a voice recognition model.

Another embodiment of the present disclosure discloses a server for providing a conversation record service, the server including: a server processor including one or more cores; a server memory for storing program codes executable in the server processor; and a server network unit for transceiving data with one or more user terminals, in which the processor receives first voice data from a first user terminal and receiving second voice data from a second user terminal, generates integrated voice data based on the first voice data and the second voice data, and generates the integrated voice data as a conversation record by using a voice recognition model.

According to the present disclosure, it is possible to provide the computing device providing a conversation record service based on a voice file including conversation contents between a plurality of users.

BRIEF DESCRIPTION OF THE SEVERAL VIEWS OF THE DRAWINGS

Various aspects are described with reference to the drawings, and herein, like reference numerals are generally used to designate like constituent elements. In the embodiment below, for the purpose of description, a plurality of specific and detailed matters is suggested in order to provide general understanding of one or more aspects. However, it is apparent that the aspect(s) may be carried out without the specific and detailed matters.

DETAILED DESCRIPTION

Figure 1:
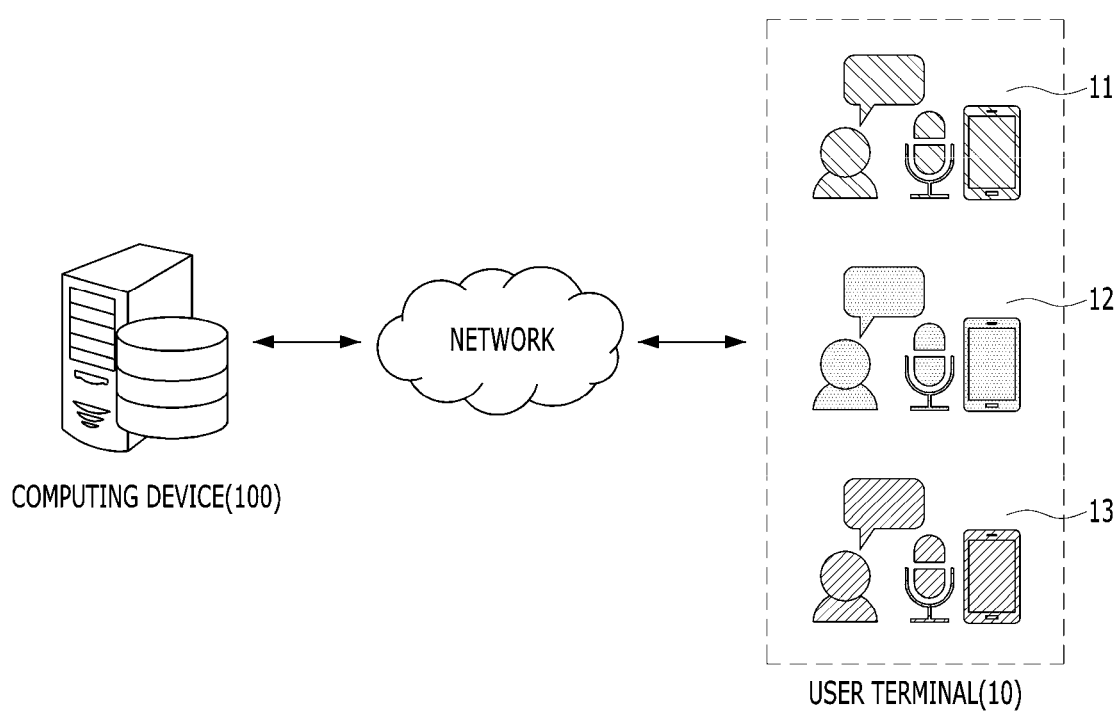
FIG. 1 is a conceptual diagram illustrating an overall system for providing a conversation record service related to an embodiment of the present disclosure.

Hereinafter, various embodiments are described with reference to the drawings. In the present specification, various descriptions are presented for understanding the present disclosure. However, it is obvious that the embodiments may be carried out even without a particular description.

Terms, "component," "module," "system," and the like used in the present specification indicate a computer-related entity, hardware, firmware, software, a combination of software and hardware, or execution of software. For example, a component may be a procedure executed in a processor, a processor, an object, an execution thread, a program, and/or a computer, but is not limited thereto. For example, both an application executed in a computing device and the computing device may be components. One or more components may reside within a processor and/or an execution thread. One component may be localized within one computer. One component may be distributed between two or more computers. Further, the components may be executed by various computer readable medium having various data structures stored therein. For example, components may communicate through local and/or remote processing according to a signal (for example, data transmitted to another system through a network, such as Internet, through data and/or a signal from one component interacting with another component in a local system and a distributed system) having one or more data packets.

A term "or" intends to mean comprehensive "or," not exclusive "or." That is, unless otherwise specified or when it is unclear in context, "X uses A or B" intends to mean one of the natural comprehensive substitutions. That is, when X uses A, X uses B, or X uses both A and B, "X uses A or B" may be applied to any one among the cases. Further, a term "and/or" used in the present specification shall be understood to designate and include all of the possible combinations of one or more items among the listed relevant items.

A term "include" and/or "including" shall be understood as meaning that a corresponding characteristic and/or a constituent element exists. Further, a term "include" and/or "including" means that a corresponding characteristic and/or a constituent element exists, but it shall be understood that the existence or an addition of one or more other characteristics, constituent elements, and/or a group thereof is not excluded. Further, unless otherwise specified or when it is unclear that a single form is indicated in context, the singular shall be construed to generally mean "one or more" in the present specification and the claims.

Those skilled in the art shall recognize that the various illustrative logical blocks, configurations, modules, circuits, means, logic, and algorithm operations described in relation to the embodiments additionally disclosed herein may be implemented by electronic hardware, computer software, or in a combination of electronic hardware and computer software. In order to clearly exemplify interchangeability of hardware and software, the various illustrative components, blocks, configurations, means, logic, modules, circuits, and operations have been generally described above in the functional aspects thereof. Whether the functionality is implemented by hardware or software depends on a specific application or design restraints given to the general system. Those skilled in the art may implement the functionality described by various methods for each of the specific applications. However, it shall not be construed that the determinations of the implementation deviate from the range of the contents of the present disclosure.

FIG. 1 is a conceptual diagram illustrating an overall system for providing a conversation record service related to an embodiment of the present disclosure.

According to the embodiment of the present disclosure, a computing device 100 and one or more user terminals 10 may transmit and receive data through an interconnection through a wireless and/or wired connection. The computing device of the present disclosure may include all kinds of computing devices capable of calculating data in an electronic form, and may include, for example, a general computing device, such as a personal computer and a server computer, and a computing device having limited operation ability, such as a mobile terminal (smartphone and tablet PC).

According to the embodiment of the present disclosure, the computing device 100 may provide a conversation record service based on voice data including conversation contents between a plurality of users. Specifically, the computing device 100 may generate a conversation record for the contents of the conversation performed between the plurality of users by receiving one or more voice data from each of the one or more user terminals 10, and converting each of the one or more received voice data into text through a voice recognition model. In this case, the one or more user terminal 10 may include a Personal Computer (PC), a notebook computer, a mobile terminal, a smart phone, a tablet PC, and the like, and may include all kinds of terminals which are capable of accessing a wired/wireless network.

The computing device 100 may provide a textualized conversation record based on each of the one or more voice data received from each of the one or more user terminals 10. In this case, the textualized conversation record is textualized voice data of a plurality of users participating in a conversation, and may be one in which the voice data of the plurality of users participating in the conversation is converted into the text and the texts are divided by time and speaker and listed. Accordingly, a plurality of users do not need to write a conversation record through a separate stenographer or write a conversation record by themselves when a conversation (or meeting) between a plurality of users is conducted, so that the plurality of users may receive a textualized conversation record including conversation contents between the plurality of users through simple voice data including the conversation contents of a plurality of users.

The computing device 100 may provide a user interface including a conversation record to one or more user terminals. In this case, the user interface includes information on each of one or more users who participated in the conversation, a conversation record in which the conversation contents of one or more users are divided by time and speaker and recorded in the form of a chat window, and various User interfaces (UIs)/User Experience (UX) for improving the usability of editing, managing, and searching conversation records to provide convenience to a plurality of users who use the computing device 100 of the present disclosure.

In the present disclosure, a process in which the computing device 100 provides a conversation record service to one or more user terminals 10 and a user interface including a conversation record will be described in detail below with reference to the following drawings.

Figure 2:
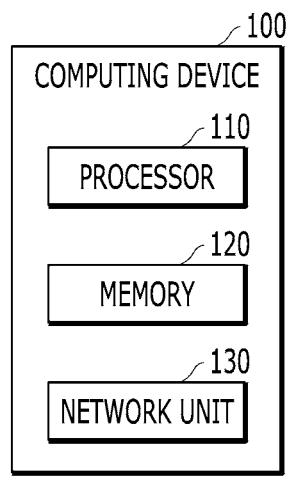
FIG. 2 is a block diagram of a computing device providing a conversation record service related to the embodiment of the present disclosure.

FIG. 2 is a block diagram of the computing device providing the conversation record service related to the embodiment of the present disclosure.

The components of the computing device 100 that provide the conversation record service illustrated in FIG. 2 are illustrative. Only some of the components illustrated in FIG. 2 may constitute the computing device 100 that provides the conversation record service, and additional component(s) in addition to the components illustrated in FIG. 2 may be included in the computing device 100 that provides the conversation record service.

As illustrated in FIG. 2, the computing device 100 providing the conversation record service may include a processor 110, a memory 120, and a network unit 130.

According to the embodiment of the present disclosure, the processor 110 may receive voice data from each of the one or more user terminals 10. In this case, the voice data received by the processor 110 is received from each of one or more user terminals 10, and there may be one or more voice data. For example, when three users conduct a conversation, the processor 110 may receive three voice data from three user terminals possessed by the three users, respectively. That is, the processor 110 may receive one or more voice data from one or more user terminals 10 possessed by each of a plurality of users, rather than receiving one voice data through one user terminal. The specific description of the number of users conducting the conversation and the number of user terminals corresponding to the number of users is merely an example, and the present disclosure is not limited thereto.

According to the embodiment of the present disclosure, the processor 110 may perform pre-processing on each of the one or more voice data received from each of the one or more user terminals 10. The processor 110 may perform pre-processing to increase a recognition rate of voice data. In this case, the pre-processing performed by the processor 110 on each of the one or more voice data may include a pre-processing for noise removal and a pre-processing for separating a speaker based on an utterance size in an utterance section.

According to the embodiment of the present disclosure, the processor 110 may remove noise of each of the one or more voice data received from each of the one or more user terminals 10. The removal of noise from each of the one or more voice data may be for removing noise included in the one or more voice data. More specifically, the processor 110 may standardize a size of a signal included in each of the one or more voice data based on a comparison between the size of the signal included in each of the one or more voice data and a size of a predetermined reference signal. The processor 110 may perform audio signal compression normalization in which when the size of the signal included in each of the voice data received from the one or more user terminals 10 is less than the predetermined reference signal, the processor 110 adjusts the size of the corresponding signal to be increased, and when the size of the signal included in each of the voice data received from the one or more user terminals 10 is equal to or greater than the predetermined reference signal, the processor 110 adjusts the size of the corresponding signal to be decreased (that is, not clipped). The noise removal operation described above is merely an example, and the present disclosure is not limited thereto.

In addition, the processor 110 may analyze a waveform of a voice included in each of one or more voice data to remove sounds other than utterances. More specifically, the processor 110 may remove at least one specific frequency by analyzing the frequency of the voice data. Each of the one or more voice data received by the processor 110 may include white noise having a uniform frequency, random frequency noise having an irregular frequency, or various noises generated according to a recording device or a signal processing process. That is, the processor 110 may perform pre-processing on the noise having various frequencies included in each of one or more voice data. Specifically, the processor 110 classifies the noise by using a machine learning algorithm, such as a Supporting Vector Machine (SVM), in order to determine the type of noise included in each of the one or more voice data, and remove the noise through a noise removing algorithm corresponding to each of the noises including different frequencies. The above-described noise removing algorithm is merely an example, and the present disclosure is not limited thereto.

The processor 110 may identify one or more utterance sections for each of one or more voice data. The processor 110 may identify one or more utterances included in the voice data. Specifically, the processor 110 may identify an utterance section of the user based on one or more silent sections existing in the voice data. For example, the processor 110 may identify an interval between a first silence section and a second silence section included in the voice data as a first utterance section of the user, and identify an interval between the second silence section and a third silence section as a second utterance section of the user. That is, the processor 110 identify a time point at which voices (that is, speech sounds) of the one or more users are not recognized in the voice data including conversation contents of one or more users (for example, a time point at which only a sound of a certain level or less is detected, and the like), and identify the utterance section of the one or more users based on the identified time point (that is, the silence section). The detailed description of the utterance section of the user is merely an example, and the present disclosure is not limited thereto.

According to the embodiment of the present disclosure, the processor 110 may identify the voice of each of the one or more users in each of the one or more utterance sections included in the voice data. Also, the processor 110 may determine a user having an utterance having a voice size equal to or greater than a predetermined size in the identified voice of each of the one or more users as a specific speaker corresponding to the voice data. More specifically, when the size of a voice of a specific user among the voices of the one or more users included in the voice data is equal to or greater than a predetermined size, the processor 110 may determine the specific user as a specific speaker corresponding to the voice data. For example, when the processor 110 receives voice data including voices of two users (user A and user B) from a first user terminal, the processor 110 determines that the size of the voice of user A is equal to or greater than a predetermined size, and determine user A as a specific speaker corresponding to the voice data received from the first user terminal. That is, in the present disclosure, the user terminal may be a terminal disposed to each user in order to collect each user's voice, so that the processor 110 may determine that an utterance of a specific size or greater in the received voice data is the utterance of the user of the user terminal from which the corresponding voice data is collected. Further, the processor 110 may determine a specific speaker corresponding to the voice data based on a comparison of the sizes of the voices of the one or more users included in the voice data. For example, when the processor 110 receives voice data including voices of two users (user A and user B) from a first user terminal, the processor 110 may determine that the size of the voice of user B among the voices of the two users included in the voice data is greater than the size of the voice of user A, so that the processor 110 may determine user B as a specific speaker corresponding to the voice data received from the first user terminal. The particular descriptions for the one or more users and the size of the voice of each of the one or more users are only examples, and the present disclosure is not limited thereto.

The processor 110 may remove voices other than the voice of a specific speaker from the voice data received from the user terminal 10. More specifically, when the specific speaker corresponding to the voice data is determined, the processor 110 may remove the voice of another user except for the voice of the specific speaker from the voice data. For example, when the voice data includes the voices of user A and user B, and user A is determined as a specific speaker corresponding to the voice data, the processor 110 may remove the voice of user B from the voice data. That is, the processor 110 may more clearly separate the voice of the specific speaker (for example, user A) by removing the voice of another user (for example, user B) from the voice data. The detailed description of the user corresponding to the above-described voice data is merely an example, and the present disclosure is not limited thereto. Accordingly, it is possible to accurately separate the respective speakers when the conversation record is written later based on the voice data, thereby generating the conversation record with higher accuracy.

The processor 110 may determine a specific speaker corresponding to each of the one or more voice data, and when other voices except for the voice of the determined specific speaker are removed from the respective voice data, the processor 110 may match the specific speaker with identification information of one or more user terminals and store the specific speaker. For example, the processor 110 may match user A determined as the specific speaker corresponding to the first voice data with identification information of the terminal of user A, and match user B determined as the specific speaker corresponding to the second voice data with identification information of the terminal of user B, and store the specific speakers. Accordingly, by determining the speaker corresponding to each of the one or more voice data received from each of the one or more user terminals, and matching each speaker to each user terminal, it is possible to more accurately separate each of the plurality of speakers who performed the conversation. The detailed description of the above-described voice data and the user terminal corresponding thereto is only an example, and the present disclosure is not limited thereto.

The processor 110 may divide the voice data into one or more voice data sub-data based on the utterance section. For example, when the processor 110 receives the first voice data through the terminal of user A, the processor 110 may divide the first voice data into one or more voice data sub-data based on one or more utterance sections identified in the first voice data. As a more specific example, when there are five utterance sections identified in the first voice data, the processor 110 may divide the first voice data into five voice data sub-data corresponding to each of the five identified utterance sections. The detailed description of the number of one or more voice data sub-data of the voice data is merely an example, and the present disclosure is not limited thereto.

According to the embodiment of the present disclosure, the processor 110 may assign a unified time point to each of the one or more voice data received from each of the one or more user terminals 10.

Specifically, the processor 110 may tag global time information to each of the one or more voice data received from each of the one or more user terminals 10. In this case, the global time information may be time information applied to each of the plurality of voice data received from each of the plurality of user terminals. More specifically, the global time information may be time information serving as a reference assigned to clarify the precedence relationship of each of a plurality of voice data. For example, the global time information may be time information determined based on time information of the computing device. A method of determining the global time information is merely an example, and the present disclosure is not limited thereto. The local time information may be time information applied to each voice data. That is, the local time information may be information about an elapsed time from the start of the voice data (for example, in the case of voice data for 8 minutes, 32 seconds, 40 seconds, and the like). The foregoing description of the local time information is merely an example, and the present disclosure is not limited thereto. That is, when the processor 110 receives the plurality of voice data from each of the plurality of user terminals 10, the processor 110 matches global time information to each of the plurality of voice data and stores the plurality of voice data, so that it is possible to clearly determine the precedence relationship of one or more voice data sub-data divided according to the utterance section in each of the plurality of voice data. For example, when two voice data (first voice data and second voice data) are received through two user terminals (the terminal of user A and the terminal of user B), it may be difficult to recognize the precedence relationship of each utterance included in the two voice data only with the local time information of each voice data. That is, when recording start times of the respective voice data are different from each other, it may be difficult for the processor 110 to clearly recognize the precedence relationship between the respective utterances included in the plurality of voice data only with local time information. For example, the first voice data received from the terminal of user A may be voice data from 11:10 to 11:20 (that is, voice data for 10 minutes), and the second voice data received through the terminal of user B may be voice data from 11:12 to 11:20 (that is, voice data for 8 minutes), and the start times of the respective voice data are different from each other, so that utterances having the same local time information may actually be utterances having different time points. Accordingly, since the precedence relationship of the voice data sub-data included in each voice data is not clearly identified, it may cause a problem in generating a conversation record through each voice data, so that the processor 110 matches the global time information to each of the first voice data and the second voice data (that is, displays the current time corresponding to each utterance section) to unify the time point of each data, thereby clearly dividing the precedence relationship between the one or more voice data sub-data divided according to the utterance section in each of the first voice data and the second voice data. The particular description of the number of user terminals, the number of voice data, and the time point of each voice data are merely examples, and the present disclosure is not limited thereto.

The processor 110 may determine the precedence relationship between the utterances included in the voice data based on the elapsed time of each of the plurality of voice data. The processor 110 may determine a reference time point applied to all of the plurality of voice data, and may determine the precedence relationship between the utterances included in the plurality of voice data based on the elapsed time from the reference time point. For example, the processor 110 determines a start time of the voice data of which recording is started first among the plurality of voice data as a reference time point and determines the elapsed time of other voice data based on the reference time point, so that it is possible to determine the precedence relationship between the plurality of utterances included in the plurality of voice data. Specifically, the processor 110 records the time when each of the one or more voice data received from each of the one or more user terminals 10 is initially generated and identifies the progress time of each voice data based on the initial time point at which each of the one or more voice data is recorded, to assign a unified time point to determine the precedence relationship between the one or more voice data sub-data included in each of the one or more voice data.

More specifically, the processor 110 may add a silence section to the voice data of which recording is started later before the corresponding voice data starts as much as a difference between a recording start time of the voice data of which recording is first started and a recording start time of the voice data of which recording is started later. That is, the processor 110 may match the reference time point (in the present example, the recording start time of the voice data of which the recording is first started, and the like) applied to the plurality of voice data and reflect a difference between the respective voice data from the reference time point to each voice data to determine the precedence relationship of the utterance. For example, when the recording of the second voice data starts 5 seconds after the start of the recording of the first voice data, the processor 110 may determine the progress time based on the reference time point (for example, the time of the computing device) for the generation of voice data, and assign a silence section of 5 seconds before the start of the recording of the second voice data to make the duration of the first voice data and the second voice data be matched with the actual utterance time. The foregoing description is merely an example, and the present disclosure is not limited thereto.

The processor 110 adds the difference between a recording start time of the voice data of which recording is first started and a recording start time of the voice data of which recording is started later to the progress time of the voice data of which the recording is started later to determine the precedence relationship between the utterances. For example, when the recording of the second voice data is started 5 seconds after the start of recording of the first voice data, the utterance located at 10 seconds from the start of the recording of the second voice data may be the utterance located at 15 seconds from the start of the recording of the first voice data. Accordingly, the processor 110 may determine the precedence relationship of each utterance included in each voice data by adding a time equal to the difference in the start time between the first voice data and the second voice data to the progress time of the second voice data. The foregoing description is merely an example, and the present disclosure is not limited thereto.

As described above, the processor 110 may determine the precedence relationship between the plurality of utterances included in the voice data by matching the global time information with the voice data and storing the voice data or by matching the information on the elapsed time from the reference time point to the voice data and storing the voice data.

The particular description of the number of user terminals, the number of voice data, and the time point of each voice data are merely examples, and the present disclosure is not limited thereto.

In the description of the voice data described below, the start time point and the end time point are based on a unified time point assigned to each of the one or more voice data in order to divide the precedence relationship of each of the one or more voice data sub-data included in each of the one or more voice data based on at least one of the global time information and the reference time point information of the voice data.

According to the embodiment of the present disclosure, the processor 110 may identify a start time point and an end time point of each of one or more voice data sub-data. Specifically, the processor 110 may identify a start time point and an end time point of each of the one or more voice data sub-data obtained by dividing the voice data based on the utterance section included in the voice data. For example, when the voice data is divided into two voice data sub-data (first voice data sub-data and second voice data sub-data) corresponding to two utterance sections, the processor 110 may identify a start time point and an end time point of the first voice data sub-data as 3 seconds and 32 seconds, respectively, and identify a start time point and an end time point of the second voice data sub-data as 1 minute 10 seconds and 1 minute 52 seconds, respectively. The detailed description of the start time point and the end time point of the aforementioned voice data sub-data is only an example, and the present disclosure is not limited thereto.

The processor 110 may synchronize the start time points and the end time points of the first voice data and the second voice data through network packet exchange between the first user terminal and the second user terminal. Specifically, the processor 110 may measure and correct an error between the start time and the end time of the first user terminal and the second user terminal through network packet exchange between the first user terminal and the second user terminal. The time of the first user terminal and the time of the second user terminal may be basically synchronized based on a NETWORK TIME PROTOCOL server. For more accurate time synchronization between the first user terminal and the second user terminal, the processor 110 may process information on the start time and end time of each terminal through a statistical analysis filter and synchronize the time of the first user terminal and the time of the second user terminal. The statistical analysis filter may calculate a time difference on the network based on a result of the comparison between the start time and the end time. The statistical analysis filter may perform the above-described time synchronization based on the calculated time difference on the network.

Figure 13:
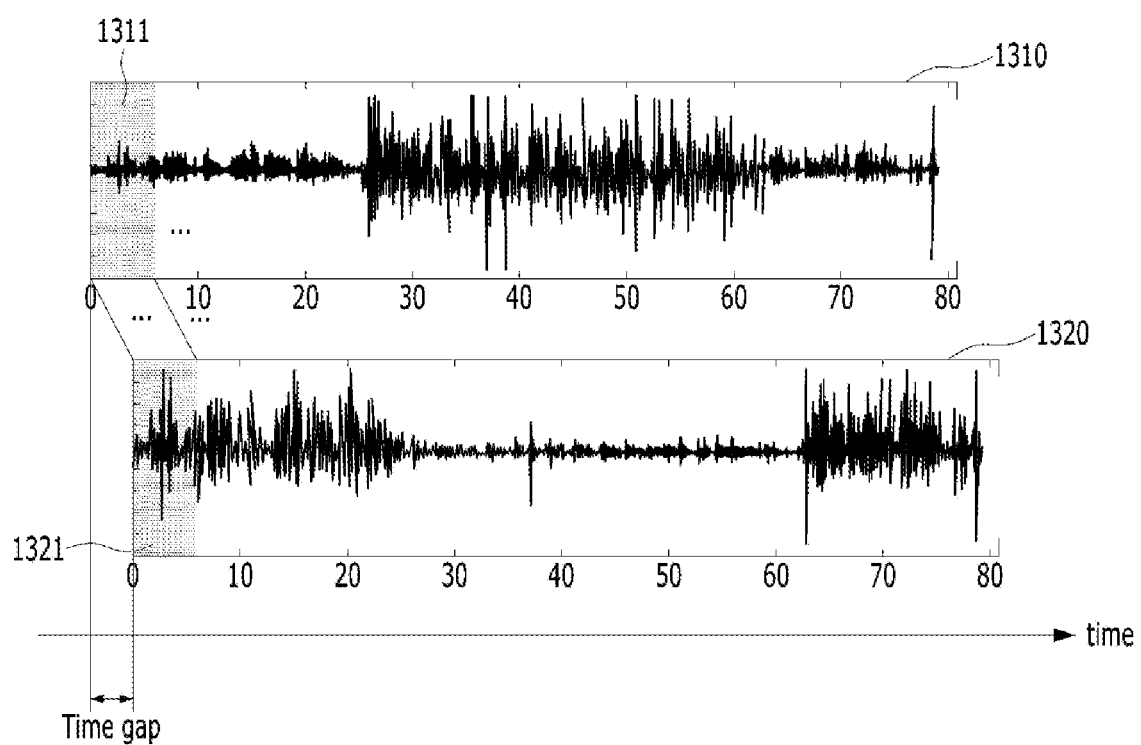
FIG. 13 is a diagram illustrating an example of synchronizing a start time point and an end time point of first voice data and second voice data according to the embodiment of the present disclosure.

FIG. 13 is a diagram illustrating an example of synchronizing a start time point and an end time point of first voice data and second voice data according to the embodiment of the present disclosure.

According to the embodiment of the present disclosure, the processor 110 may synchronize the start time points and the end time points of the first voice data and the second voice data based on the similarity between the first voice data sub-data and the second voice data sub-data. In particular, the processor 110 may measure and correct a time delay of each voice data sub-data based on first voice data 1310 and second voice data 1320. The processor 110 may search for similar signals 1311 and 1321 between the first voice data sub-data and the second voice data sub-data, and measure a time delay based on the similar signals to synchronize the start time points and the end time points of the first voice data and the second voice data. In this case, various feature extraction algorithms, such as FAST FOURIER TRANSFORM (FFT) and MEL-FREQUENCY CEPSTRAL COEFFICIENTS (MFCC), may be used for voice signal analysis.

According to the embodiment of the present disclosure, the processor 110 may generate a conversation record by converting integrated voice data into a voice recognition result through a voice recognition model. In this case, the integrated voice data may be generated based on the first voice data and the second voice data received from each user terminal. In addition, the processor 110 may divide the first voice data into one or more first voice data sub-data based on the utterance section, and divide the second voice data sub-data into one or more second voice data sub-data based on the utterance section. For example, when there are three utterance sections identified in the first voice data, the processor 110 may divide the first voice data into first voice data first sub-data, first voice data second sub-data, and first voice data third sub-data based on the three utterance sections. As another example, when there are two utterance sections identified in the second voice data, the processor 110 may divide the second voice data into second voice data first sub-data and second voice data second sub-data based on the two utterance sections. The description of the specific numerical values of the utterance sections included in the above-described first and second voice data is only an example, and the present disclosure is not limited thereto.

Figure 14:
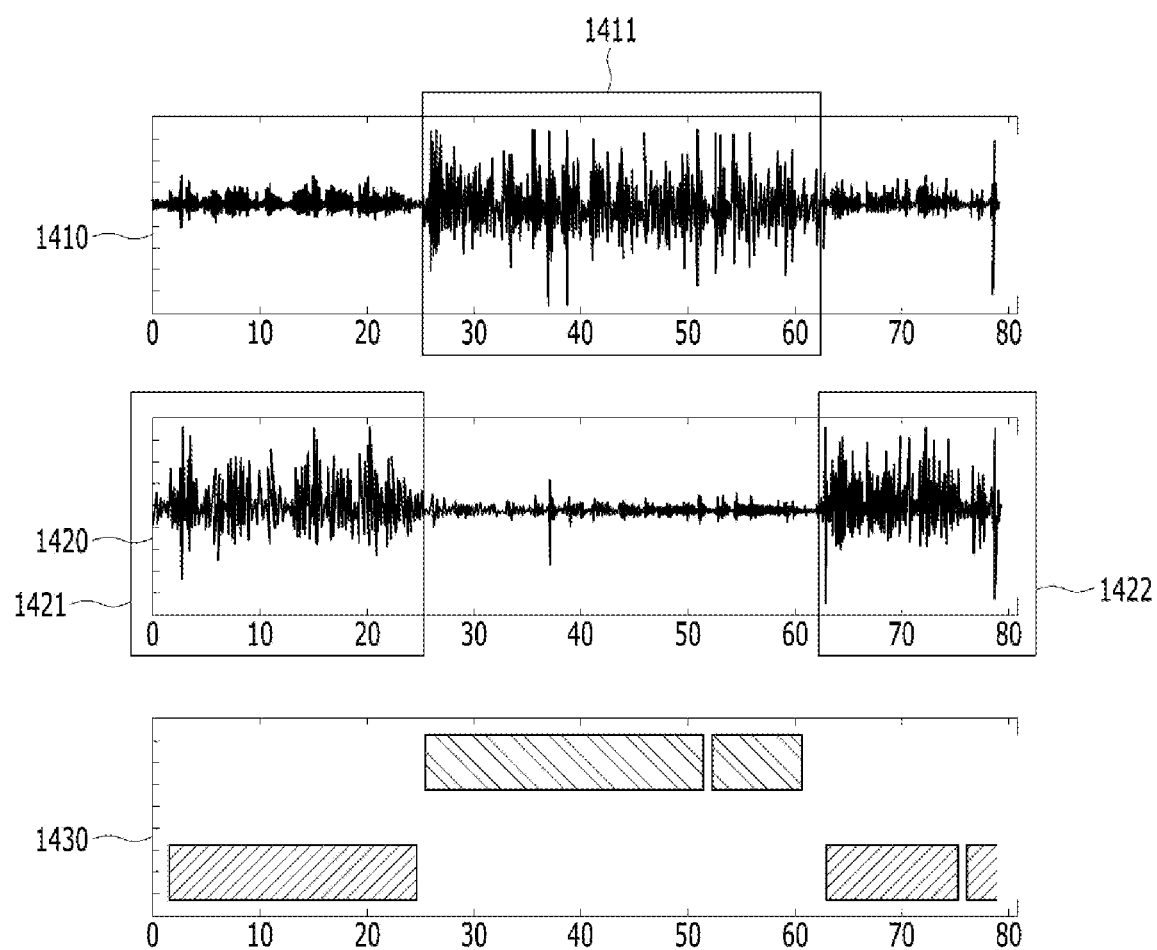
FIG. 14 is a diagram illustrating an example of a process of dividing a speaker according to the embodiment of the present disclosure.

FIG. 14 is a diagram illustrating an example of a process of dividing a speaker based on a size of a voice signal according to the embodiment of the present disclosure.

According to an embodiment of the present disclosure, the processor 110 may generate integrated voice data based on the first voice data and the second voice data. Specifically, the processor 110 may divide a speaker based on a voice signal size of each of the first voice data and the second voice data, and generate integrated voice data based on the separated speaker information. The processor 110 may calculate a voice signal intensity for a frame of each of the first voice data and the second voice data, and divide the speaker by comparing the voice signal sizes of the frames of the first voice data and the second voice data. For example, the processor 110 may compare the voice signal sizes of the first voice data frame and the second voice data frame 1421 in the section of 0 to 20 seconds. The processor 110 may divide the second voice data frame 1421 having a larger voice signal size as a speaker. The processor 110 may determine a speaker in the section of 0 to 25 seconds as a second user. The processor 110 may compare the voice signal sizes of the first voice data frame 1411 and the second voice data frame in the section from 25 to 63 seconds. The processor 110 may divide the first voice data frame 1411 having a larger voice signal size as the speaker, and determine the speaker in the section between 25 seconds to 63 seconds as a first user. The processor 110 may compare the voice signal sizes of the first voice data frame and the second voice data frame 1422 in the section from 63 seconds to 80 seconds, and divide the second voice data frame 1422 having a larger voice signal size as a speaker of the section from 63 seconds to 80 seconds. The processor 110 may determine a speaker in the section from 63 seconds to 80 second as the second user. The processor 110 may generate integrated voice data 1430 by dividing the speaker for each section. In the present disclosure, the voice data frame may be a predetermined time section of the voice data for determining a speaker in the voice data. The description for the generation of the integrated voice data by dividing the speaker based on the voice data is merely an example, and the present disclosure is not limited thereto.

Figure 15:
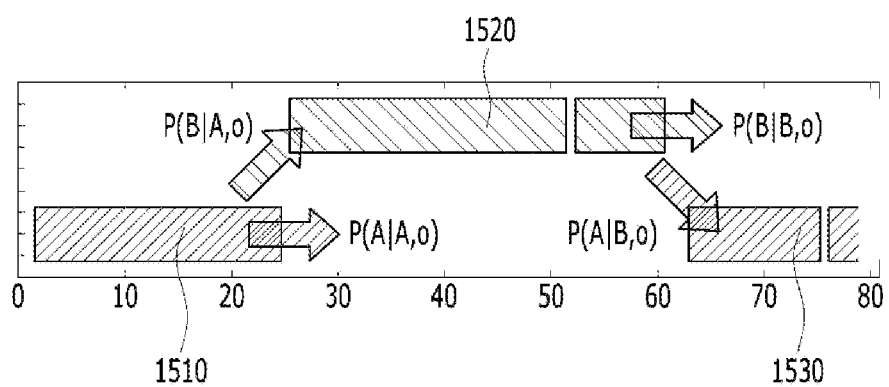
FIG. 15 is a diagram illustrating an example of a process of dividing a speaker through a statistical acoustic model according to the embodiment of the present disclosure.

FIG. 15 is a diagram illustrating an example of a process of dividing a speaker through a statistical acoustic model according to the embodiment of the present disclosure.

According to the embodiment of the present disclosure, the processor 110 may divide a speaker through a statistical acoustic model based on the first voice data and the second voice data.

More specifically, the processor 110 may divide a speaker of a current time point frame based on speaker information of an adjacent frame. For example, when the speaker information of the current time point frame 1520 is divided, and a speaker of a previous time point frame 1510 is determined as speaker A, there may be a higher probability that a speaker of the current time point frame 1520 will become the speaker A who is the speaker of the previous time point frame 1510. Accordingly, the processor 110 may determine the speaker of the current time point frame 1520 to generate integrated voice data by reflecting the speaker information of the previous time point frame 1510 to the statistical acoustic model. In addition, when speaker information of a frame 1530 after the current time point is determined, the processor 110 may determine the speaker of the current time point frame 1520 and generate integrated voice data by reflecting the speaker information of the frame 1530 after the current time point to the statistical acoustic model. Also, the processor 110 may determine the speaker of the current time point frame by comparing the speaker in the adjacent frame with the speaker determined based on the size of the voice signal in the current frame. For example, when the speaker in the previous time point frame 1510 is A, the speaker determined based on the size of the voice signal in the current time point frame 1520 is B, and the speaker of the frame 1530 after the current time point is A, the processor 110 may treat the speaker in the current time point frame 1520 as A and speaker B having the large voice signal size as noise based on statistical information. The description for dividing the speakers based on the aforementioned adjacent frames is merely an example, and the present disclosure is not limited thereto.

The processor 110 may divide the speaker based on an utterance time ratio of the speaker of each of the first voice data and the second voice data. More specifically, when the processor 110 identifies an overlapping section based on the start time point and the end time point of each of the one or more first voice data sub-data and second voice data sub-data, the processor 110 may divide the speaker by calculating an utterance time ratio for each speaker based on the speakers of the frames excluding the overlapping section. The processor 110 may determine the voice data having a large utterance time ratio by calculating a ratio of the utterance time of the first voice data excluding the overlapping section and the utterance time of the second voice data excluding the overlapping section. The processor 110 may determine that there is a high probability that the speaker of the voice data determined to have the large utterance time ratio becomes the speaker of the overlapping section frame. The processor 110 may divide a speaker in an overlapping section based on an utterance time ratio of one or more voice data calculated through a statistical acoustic model. For example, a ratio of the utterance time other than the overlapping section of the first voice data and the utterance time of the second voice data other than the overlapping section may be 7:3. The processor 110 may determine the speaker of the overlapping section frame as the speaker of the first voice data by reflecting the corresponding ratio by using the statistical acoustic model. The example of dividing the speaker in the overlapping section is merely an example, and is not limited to the present disclosure.

The processor 110 may divide the speaker based on an utterance time ratio for each speaker with respect to the previous frame of the overlapping section frame. More specifically, when the identified overlapping section is a frame after a selected (or a predetermined) time ratio, the processor 110 may divide the speaker of the overlapping section frame through the statistical acoustic model based on the utterance time ratio for each speaker up to the time before the overlapping section. For example, the start time point of the overlapping section frame in the conversation between the first user terminal and the second user terminal for 30 minutes may be 14 minutes and 10 seconds. When the selected (or the predetermined) time ratio is 20 percent, the overlapping section frame may be a time point after 6 minutes corresponding to the selected (or the predetermined) time ratio. The utterance time ratio of the voice data of each of the first user terminal and the second user terminal up to 14 minutes and 10 seconds that is the time point before the overlapping section frame may be 7:3. The processor 110 may determine the speaker of the first user terminal as the speaker of the overlapping section frame through the statistical acoustic model based on the utterance ratio up to the time point before the overlapping section frame. The detailed description of the method for determining the speaker is merely an example, and the present disclosure is not limited thereto.

According to the embodiment of the present disclosure, the processor 110 may generate the integrated voice data as a conversation record by using the voice recognition model. The processor 110 may generate integrated voice data based on the first voice data received from the first user terminal and the second voice data received from the second user terminal. The processor 110 may generate the generated integrated voice data as a conversation record by using the voice recognition model. Specifically, the processor 110 may mix down the first voice data and the second voice data to generate the integrated voice data. When mixing down the first voice data and the second voice data, the processor 110 may determine the speaker of the frame of the integrated voice data based on the speaker information for each frame of each of the first voice data and the second voice data. Also, the processor 110 may generate a text-type conversation record by calculating the integrated voice data through the voice recognition model. In this case, the voice recognition model may be a model that converts the voice language spoken by the user into text data. The voice recognition model may include one or more network functions pre-trained through training data.

According to the embodiment of the present disclosure, the processor 110 may output one or more voice recognition sub-results corresponding to each of the one or more voice data sub-data by using each of the one or more voice data sub-data as an input of the voice recognition model. In this case, the voice recognition model is a model that converts the voice language spoken by the user into text data, and may include one or more network functions pre-trained through training data. In addition, the processor 110 may determine the order of each of the one or more voice recognition sub-results in the conversation record based on the start time point and the end time point identified in each voice data sub-data that is the basis of the one or more voice recognition sub-results. As a specific example, the processor 110 may input each of the first voice data sub-data and the second voice data sub-data to the voice recognition model and output first voice recognition sub-result and second voice recognition sub-result. The processor 110 may identify the start time point and the end time point of the first voice data sub-data based on the output of the first voice recognition sub-result as 3 seconds and 32 seconds, respectively, and identify the start time point and the end time point of the second voice data sub-data based on the output of the second voice recognition sub-result as 1 minute 10 seconds and 1 minute 52 seconds, respectively. The processor 110 may determine the order of the first voice recognition sub-result and the second voice recognition sub-result in the conversation record based on the determined time information. That is, the processor 110 may identify the start time point and the end time point of the voice data sub-data corresponding to each of the one or more voice recognition sub-results, and determine the order in which each of the one or more voice recognition sub-results is displayed in the conversation record based on at least one of the identified start time point and end time point. That is, the one or more voice recognition sub-results in the conversation record may be sequentially arranged according to the start time point and the end time point. For example, when the start time point of the first voice recognition sub-result is earlier than the start time of the second voice recognition sub-result, the processor 110 may determine the order so that the first voice recognition sub-result is displayed before the second voice recognition sub-result in the conversation record. For another example, when the end time point of the second voice recognition sub-result is earlier than the end time point of the first voice recognition sub-result, the processor 110 may also determine the order so that the second voice recognition sub-result is displayed before the first voice recognition sub-result in the conversation record. The detailed description of the start time point and the end time point corresponding to the first voice recognition sub-result and the second voice recognition sub-result is merely an example, and the present disclosure is not limited thereto.

According to the embodiment of the present disclosure, the processor 110 may generate a conversation record by converting each of one or more voice data into one or more voice recognition results through the voice recognition model. In this case, the one or more voice data may include first voice data and second voice data received from each user terminal. In addition, the processor 110 may divide the first voice data into one or more first voice data sub-data based on the utterance section, and divide the second voice data into one or more second voice data sub-data based on the utterance section. For example, when there are three utterance sections identified in the first voice data, the processor 110 may divide the first voice data into first voice data first sub-data, first voice data second sub-data, and first voice data third sub-data based on the three utterance sections. For another example, when there are two utterance sections identified in the second voice data, the processor 110 may divide the second voice data into second voice data first sub-data and second voice data second sub-data based on the two utterance sections. The description of the specific numerical values of the utterance sections included in the above-described first and second voice data is only an example, and the present disclosure is not limited thereto.

The processor 110 may identify a start time point and an end time point of each of the one or more first voice data sub-data and each of the one or more second voice data sub-data. For example, when the first voice data is divided into first voice data first sub-data, first voice data second sub-data, and first voice data third sub-data based on three utterance sections, and the second voice data is divided into second voice data first sub-data and second voice data second sub-data based on two utterances sections, the processor 110 may identify the start time points of the five voice data sub-data as 10 seconds (first voice data first sub-data), 21 seconds (first voice data second sub-data), 32 seconds (first voice data third sub-data), 17 seconds (second voice data first sub-data), and 25 seconds (second voice data second sub-data), respectively. The detailed description of the start time point of the aforementioned voice data sub-data is only an example, and the present disclosure is not limited thereto.

The processor 110 may output one or more first voice recognition sub-results and one or more second voice recognition sub-results corresponding to each sub-data by using one or more first voice data sub-data and one or more second voice data sub-data as an input of the voice recognition model. For example, when the first voice data first sub-data is input to the voice recognition model, the processor 110 may output the first voice recognition first sub-result, and when the second voice data first sub-data is input to the voice recognition model, the processor 110 may output the second voice recognition second sub-result.

The processor 110 may determine the order in which each of the one or more first voice recognition sub-results and the one or more second voice recognition sub-results are displayed on the conversation record based on the start time point and the end time point identified in the respective voice data sub-data that are the basis of the one or more first voice recognition sub-result and the one or more second voice recognition sub-result. As a specific example, in the above example, the first voice recognition first sub-result, the first voice recognition second sub-result, the first voice recognition third sub-result, the second voice recognition first sub-result, and the second voice recognition second sub-result may be generated based on the first voice data first sub-data, the first voice data second sub-data, the first voice data third sub-data, the second voice data first sub-data, and the second voice data second sub-data. The processor 110 may identify the starting time points of the five voice data sub-data, which is the basis for generating the five voice recognition sub-results as 10 seconds (first voice data first sub-data), 21 seconds (first voice data second sub-data), 32 seconds (first voice data third sub-data), 17 seconds (second voice data first sub-data), and 25 seconds (second voice data second sub-data), respectively. In addition, the processor 110 may determine the order in which the five voice recognition sub-results are displayed in the conversation record based on the identified start time points. That is, the five voice recognition sub-results are displayed in the conversation record in order of the first voice recognition first sub-result (10 seconds), the second voice recognition first sub-result (17 seconds), the first voice recognition second sub-result (21 seconds), the second voice recognition second sub-result (25 seconds), and the first voice recognition third sub-result (32 seconds).

The processor 110 may generate a conversation record based on the determined order of each of the one or more first voice recognition sub-results and the one or more second voice recognition sub-results, and identification information of each of the one or more user terminals 10. For example, the processor 110 may identify the speaker based on the identification information of the first user terminal matched to each of the one or more first voice recognition sub-results. In addition, the processor 110 may identify the speaker based on the identification information of the second user terminal matched to each of the one or more second voice recognition sub-results. Accordingly, each voice recognition sub-result may be recorded in the conversation record in the form of a chat window based on the identification information of each user terminal. That is, the processor 110 may generate a conversation record in which each speaker (for example, the first user using the first user terminal and the second user using the second user terminal) is separated.

According to the embodiment of the present disclosure, the processor 110 may identify overlapping sections of utterances of the plurality of users based on the start time point and end time point of each of the one or more first voice data sub-data and the one or more second voice data sub-data. In this case, the first voice data sub-data is included in the first voice data received through the first user terminal and the second voice data sub-data is included in the second voice data received through the second user terminal, so that each of the first voice data sub-data and the second voice data sub-data may be generated based on the voice data received from different user terminals. Specifically, the processor 110 may identify whether the first voice data sub-data and the second voice data sub-data of the first voice data and the second voice data overlap in time through the start time point and the end time point of each of the one or more first voice data sub-data and each of the one or more second voice data sub-data obtained by dividing the first voice data and the second voice data received from the different terminals based on the respective utterance sections. That is, the processor 110 may identify a section in which utterances overlap among the plurality of utterances of the plurality of users in each voice data. For example, when start and end time points of the first voice data first sub-data, the first voice data second sub-data, and the first voice data third sub-data included in the first voice data received through the first user terminal are 10 to 15 seconds, 21 to 28 seconds, and 32 to 35 seconds, respectively, and the start and end time points of the second voice data first sub-data and the second voice data second sub-data included in the second voice data received through the second user terminal are 17 to 20 seconds and 25 to 31 seconds, respectively, the processor 110 may identify that the first voice data second sub-data and the second voice data second sub-data overlap, and identify a section from 25 seconds to 28 seconds as the overlapping section. The detailed description of the start time point and the end time point of each of the first voice recognition sub-result and the second voice recognition sub-result is merely an example, and the present disclosure is not limited thereto.

When the overlapping section is identified, the processor 110 may determine the order of the voice recognition sub-results corresponding to the overlapping section. In the following example, the first voice recognition sub-result is a voice recognition sub-result for one of the sub-data of the first voice data included in the first voice data received from the first user terminal, and the second voice recognition sub-result may be a voice recognition sub-result for one of the sub-data of the second voice data included in the second voice data received from the second user terminal. The processor 110 may identify, based on time information of the first voice data sub-data and the second voice data sub-data, that the first voice recognition sub-result and the second voice recognition sub-result are the utterances at the overlapping time. In this case, the processor 110 may determine the order of the first voice recognition sub-result and the second voice recognition sub-result in the conversation record according to a predetermined reference. For example, when the start time of the first voice data sub-data, which is the basis of the first voice recognition sub-result, is earlier than the start time of the second voice data sub-data, the processor 110 may arrange the first voice recognition sub-result before the second voice recognition sub-result on the conversation record.

The processor 110 may also divide at least one of the voice recognition sub-results corresponding to the overlapping section. Specifically, when the overlapping is identified in the utterances based on the start time point and the end time point of each of the first voice data sub-set and the second voice data sub-set that are the basis of the outputs of the first voice recognition sub-result and the second voice recognition sub-result, respectively, the processor 110 may determine to divide at least one sub-result between the first voice recognition sub-result and the second voice recognition sub-result. More specifically, when the second voice data sub-data starts between the start and end times of the first voice data sub-data that is the basis of the first voice recognition sub-result, the processor 110 may divide the first voice recognition sub-result based on the start time of the second voice data sub-data. For example, it may be assumed that in the case where the first voice data sub-data is data including a 10-second utterance, the utterance of the second voice data sub-data starts 5 seconds after the start of the utterance of the first voice data sub-data. In this case, the processor 110 may divide the first voice recognition sub-result, which is the voice recognition result of the 10-second utterance of the first voice data sub-data, based on 5 seconds, and arrange the divided result on the conversation record. That is, in the present example, the processor 110 may arrange first text in the section between 0 and 5 seconds of the first voice recognition sub-result, text of the second voice recognition sub-result, and second text in the section between 5 and 10 seconds of the first voice recognition sub-result on the conversation record in order. The description related to the time and the division of the voice data sub-data is merely an example, and the present disclosure is not limited thereto.

When the overlapping section is identified, the processor 110 may also divide each voice recognition sub-result based on meaning. The processor 110 may determine a dividing point of the voice recognition sub-result based on natural language processing for the voice recognition sub-result. In addition, the processor 110 may determine an end point of a sentence for each voice recognition sub-result by analyzing a combination probability of words included in each voice recognition sub-result for each of the first voice recognition sub-result and the second voice recognition sub-result corresponding to the overlapping section, based on a statistical language model. In this case, the statistical language model may be a model capable of calculating the probability of a sentence or calculating the probability of the next word when previous words are input, and may be a model capable of determining how appropriate a combination of words is or how appropriate a corresponding sentence is. Also, the processor 110 may determine whether to divide the voice recognition sub-result based on the determined end points for each of the voice recognition sub-results. For example, the start time point and the end time point of the first voice data sub-data are identified as 5 seconds and 20 seconds, respectively, and the start time point and the end time point of the second voice data sub-data are identified as 12 seconds and 18 seconds, respectively (that is, when an overlapping section of utterances for 6 seconds between 12 seconds and 18 seconds is identified), the processor 110 may determine the end point of the sentence for the first voice recognition sub-result by outputting the degree of suitability for each word and a plurality of combinations of the respective words included in the first voice recognition sub-result by using the first voice recognition sub-result as an input of the statistical language model. Further, when the end point is determined in the first voice recognition sub-result, the processor 110 may determine to divide the first voice recognition sub-result. For more specific example, it is assumed that the utterance of the voice data included in the overlapping section is "Jeojakkwon gwanryun sangdameul batgo sibpeo chaja beobge (Jeojakkwon gwanryuniyo?) doieutseubnida. Ne, matseubnida." In the above-mentioned assumption, the utterance in parentheses may be the utterance of the second speaker (that is, the utterance recognized from the second voice data), and the utterance outside the parentheses may be the utterance of the first speaker (that is, the utterance recognized from the first voice data). In this case, the statistical language model may recognize each of the words, "jeojakkwon," "gwanryun," "sangdameul," "batgo," "sibpeo," "chaja," "beobge," "doieutseubnida," "Ne," and "matseubnida," included in the first voice recognition sub-result, and output combination suitability of the words "doieutseubnida" and "Ne" to be lower, and accordingly, the processor 110 may determine "doieutseubnida" as the end point in the sentence. Also, the processor 110 may determine to divide the first voice recognition sub-result based on the end point in the sentence determined in the first voice recognition sub-result. The detailed description of the start time point and the end time point of each of the first voice data sub-data and the second voice data sub-data described above is only an example, and the present disclosure is not limited thereto.

When the division of at least one of the first voice recognition sub-result and the second voice recognition sub-result is determined, the processor 110 may divide the voice recognition sub-result corresponding to the overlapping section. As a specific example, when the start time point and the end time point of the first voice data sub-data are identified as 5 seconds and 20 seconds, respectively, and the start time point and the end time point of the second voice data sub-data are identified as 12 seconds and 18 seconds, respectively, so that it is identified that an overlapping section exists, and when the words included in the first voice recognition sub-result are "jeojakkwon," "gwanryun," "sangdameul," "batgo," "sibpeo," "chaja," "beobge," "doieutseubnida," "Ne," and "matseubnida," and when the respective words included in the second voice recognition sub-result are "jeojakkwon" and "gwanryuniyo?," the processor 110 may determine "doieutseubnida" of the first voice recognition sub-result as an end point in the sentence for the first voice recognition sub-result based on the degree of fitness for the combinations of the words output from the statistical language model. In addition, the processor 110 may divide the first voice recognition sub-result into "Jeojakkwon gwanryun sangdameul batgo sibpeo chaja beobge doieutseubnida" and "Ne, matseubnida" based on the end point determined in the first voice recognition sub-result. In other words, the processor 110 identifies that there is the second voice recognition sub-result output based on the utterance of another user between the start time point and the end time point corresponding to the first voice recognition sub-result (that is, identify the overlapping section) and recognizes the meaning of the word included in the voice recognition sub-result in the overlapping section to divide the voice recognition sub-result so that the precedence relationship between the respective voice recognition sub-results is clearly displayed. That is, the processor 110 may divide the first voice recognition sub-result into "Jeojakkwon gwanryun sangdameul batgo sibpeo chaja beobge doieutseubnida" and "Ne, matseubnida" so that the word (that is, "Jeojakkwon gwanryuniyo?") included in the second voice recognition sub-result is disposed between the first voice recognition sub-results. The detailed description of the start time point and the end time point of each of the first voice data sub-data and the second voice data sub-data and the detailed description of the first voice recognition sub-result and the second voice recognition sub-result are only examples, and the present disclosure is not limited thereto.

According to the present disclosure, as described above, it is possible to determine the order of the one or more voice recognition results output from the two voice data by receiving two voice data from the respective user terminals and generate the two voice data as a conversation record based on the identification information of the two user terminals, but it may be apparent to those skilled in the art that a conversation record may be generated by receiving two or more voice data through the processes of the present disclosure.

According to the embodiment of the present disclosure, the processor 110 may determine a keyword corresponding to the conversation record. Specifically, the processor 110 may determine one or more keywords for the conversation record based on at least one of a semantic analysis result of one or more voice recognition results, the number of times of the repetition for each word included in the one or more voice recognition results, and a pre-determined conversation topic.

The processor 110 may determine one or more keywords for the conversation record based on the semantic analysis result of the one or more voice recognition results. More specifically, the processor 110 may determine one or more keywords based on the importance of the meaning of each of the one or more words included in each of the one or more voice recognition results. For example, when the respective words included in the voice recognition result are "jeojakkwon," "gwanryun," "sangdameul," "batgo," "sibpeo," "chaja," "beobge," and "doieutseubnida," the processor 110 may determine that the meanings of "jeojakkwon" or "sangdameul" have relatively high importance, and determine "jeojakkwon" or "sangdameul" as keywords. The detailed description of the one or more words included in the voice recognition result and the importance of each of the one or more words is merely an example, and the present disclosure is not limited thereto.

The processor 110 may determine one or more keywords for the conversation record based on the number of times of the repetition for each word included in each of the one or more voice recognition results. Specifically, the processor 110 may identify the number of time of the repetition (that is, the number of overlapping) of each of one or more words included in the voice recognition result, and determine a word having a high number of times of the repetition as a keyword for the conversation record.

The processor 110 may determine a keyword based on a predetermined conversation topic. More specifically, the processor 110 may determine the topic of the conversation from the semantic analysis of the voice recognition result, or may receive the conversation topic from the user terminal 10 and determine a keyword in response to the received conversation topic. For example, when "jeojakkwon" is received from the user terminal 10 as a conversation topic, the processor 110 may determine "infringement," "accusation," and "offense subject to complaint" related to the topic (that is, "jeojakkwon") as keywords. In this case, one or more keywords corresponding to each of the plurality of conversation topics may be pre-stored in the memory 120. The specific description of the above-described conversation topic and keywords corresponding to the conversation topic is merely an example, and the present disclosure is not limited thereto.

According to the embodiment of the present disclosure, the processor 110 may identify the position of one or more keywords in one or more voice recognition results. Specifically, the processor 110 may identify at least one of a location on the conversation record and a location on the voice data of each of one or more keywords in the one or more voice recognition results included in the conversation record. In addition, the processor 110 may identify a location of each of one or more keywords from one or more voice recognition results included in the conversation record, and reproduce the voice data sub-data corresponding to each of the one or more keywords. In detail, the processor 110 may identify a keyword in the conversation record generated through the one or more voice recognition results output by using each of the one or more voice data as an input of the voice recognition model, and reproduce the voice data sub-data including the identified keyword in response to the identified keyword. That is, the processor 110 may identify only a part corresponding to a specific keyword among the voice data received from the user terminal 10 in the conversation record and provide the identified part as a voice recognition result, and may reproduce the voice data sub-data section corresponding to the identified voice recognition result, thereby providing convenience to the user. In other words, the user may be provided with only a specific important part of the conversation record, and may be provided with a reproduction screen to reproduce a section corresponding to the specific part in the recorded data (that is, voice data), the user is capable of searching for only a specific important part (that is, keyword) as needed without having to read the entire conversation record or listen to all the recorded data, so that the user may be provided with convenience in grasping the gist of the conversation.

According to the embodiment of the present disclosure, the processor 110 may provide a user interface including the conversation record generated based on the voice data received from each of the one or more user terminals 10 to the one or more user terminals.

The user interface provided by the processor 110 to the one or more user terminals 10 will be described in detail later with reference to FIGS. 4 to 7.

Figures 4A, 4B:
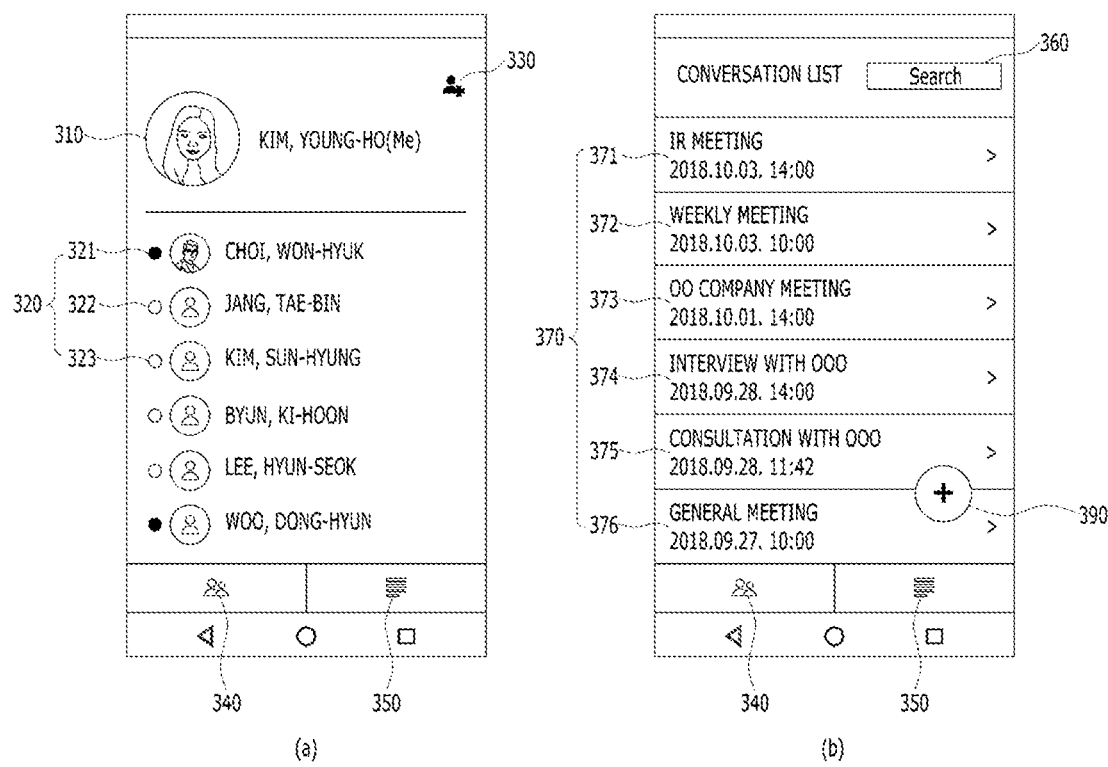
FIGS. 4A and 4B are diagrams illustrating examples of a user interface including a user list display screen and a conversation list display screen according to the embodiments of the present disclosure.

FIGS. 4A and 4B are diagrams illustrating examples of a user interface including a user list display screen and a conversation list display screen according to the embodiments of the present disclosure.

The user interface may be displayed on a display means of the user terminal 10.

The user interface generated by the processor 110 and provided to the one or more user terminals 10 may provide, as illustrated in FIG. 4A, profile information 310 of the user who uses the conversation record service, access display information 320 for a list of other users registered by the user and an access status of other registered users, and a user list display screen 340 displaying a registration request button 330 for additional registration of other users. However, since the information displayed on the corresponding user list display screen is not essential, additional information may be further included in the user list display information.

The user list display screen 340 included in the user interface may display the profile information 310 of the user. For example, the profile information of the user displayed on the user interface may include information related to user's name, company name, position, contact information, and the like. In addition, the user list display screen 340 included in the user interface may display a list of one or more other users registered as friends by the user, and may display the access display information 320 displaying the access status of one or more other users corresponding to each of the list of one or more other users. For example, as illustrated in FIGS. 4A and 4B, the user interface may display another user named "CHOI, Won-Hyuk" registered by the user on the user list display screen, and display access display information indicating the current access status of "CHOI, Won-Hyuk" is displayed together. As a more specific example, when a user terminal corresponding to CHOI, Won-Hyuk' among one or more other users does not access the computing device 100, the user interface may display access display information 321 of the corresponding user, and when user terminals corresponding to "JANG, Tae-Bin" and "KIM, Sun-Hyung," respectively, access the computing device 100, the user interface may display access display information 322 and 323. The detailed description of the user list display screen included in the user interface is only an example, and the present disclosure is not limited thereto.

The user list display screen 340 included in the user interface may display a friend adding button 330 for additionally registering another user, and when the processor 110 receives a selection input for the corresponding friend adding button 330 from the user terminal 10, the processor 110 may determine to transmit a control signal to the user terminal to provide an ID input window through which a unique ID of another user who intends to conduct a conversation or meeting is received. In addition, when information about the ID of another user is received through the corresponding ID input window from the user terminal 10, the processor 110 may determine to transmit a control signal for adding and displaying information (for example, ID) of another user to the user list display screen 340 to the user terminal 10 so that a meeting or conversation with another user is conducted.

The user interface may include a conversation list display screen 350 in which one or more conversations that the user has conducted with other users are displayed. Specifically, the user interface may provide a screen displaying a name of each of one or more conversations performed with other users based on the selection input of the user for the conversation list display screen 350. In this case, the conversation list display screen 350 included in the user interface may include one or more conversation items 370 performed by the user, a conversation content search button 360, and a chat room open button 390 for opening a chat room.

The conversation list display screen 350 included in the user interface may arrange and display the names of the one or more conversations that the user has performed with each of one or more other users. In this case, in the list of one or more conversations, as illustrated in FIGS. 4A and 4B, IR meeting 371, weekly meeting 372, 00 company meeting 373, interview with OOO 374, consultation with OOO 375, and general meeting 376 may be arranged and displayed. In addition, the name for each conversation may be one generated based on the selection input received from the user terminal when the chat room is opened, and may be one generated as a result of semantic analysis for each conversation or generated based on a keyword determined in each conversation.

The conversation list display screen 350 included in the user interface may display one or more time point information corresponding to each of the one or more conversations performed by the user. For example, as illustrated in FIGS. 4A and 4B, when the name of the conversation performed by the user is the IR meeting 371, time point information, "2018.10.03. 14:00" may be displayed in response to the IR meeting 371. Also, the names of the one or more conversations displayed on the conversation list display screen may be sorted in descending order or ascending order based on the time point information.

The conversation list display screen 350 included in the user interface may display the conversation search button 360 for searching for a specific conversation among the one or more conversations performed by the user. When a selection input for the conversation search button is received from the user terminal 10 through the conversation list display screen 350, the processor 110 may determine to transmit a control signal for providing a search window for receiving a number or text to the user terminal 10. In addition, when information on numbers or text in the search window are received from the user terminal 10, the processor 110 may determine to transmit a control signal for searching for and providing a conversation corresponding to the information on the numbers or text received from the user terminal 10 to the user terminal 10. In this case, the selection input received by the processor 110 from the user terminal 10 may be information on at least one of the name of the conversation, information on the time point of the conversation, and information on the one or more users included in the conversation. That is, the processor 110 may perform a search for a specific conversation among the one or more conversations based on the name of the conversation, the information on the time point of the conversation, and the information on the one or more users included in the conversation (for example, ID information for each of the one or more users who performed the conversation).

When a selection input is received from the user terminal for a specific conversation name among the one or more conversation names displayed on the conversation list display screen 350 included in the user interface, the processor 110 may determine to transmit a control signal for providing a conversation record display screen corresponding to the corresponding conversation name to the user terminal 10 based on the selection input of the user terminal. The conversation record display screen provided to the user terminal based on the selection input of the user terminal for the specific conversation name among the one or more conversation names performed by the user will be described later in detail with reference to FIGS. 6A and 6B.

The conversation list display screen 350 included in the user interface may include a chat room open button for receiving a selection input from the user terminal 10 in order for the user to open a chat room with one or more other users. In addition, when the selection input for the chat room open button is received from the user terminal 10, the processor 110 may determine to transmit a control signal for providing a user selection input screen for including one or more other users in the chat room to the user terminal 10. The user selection input screen included in the user interface and the chat room opened based on the selection input of the user terminal for the user selection input screen will be described later in detail with reference to FIGS. 5A and 5B.

Figures 5A, 5B:
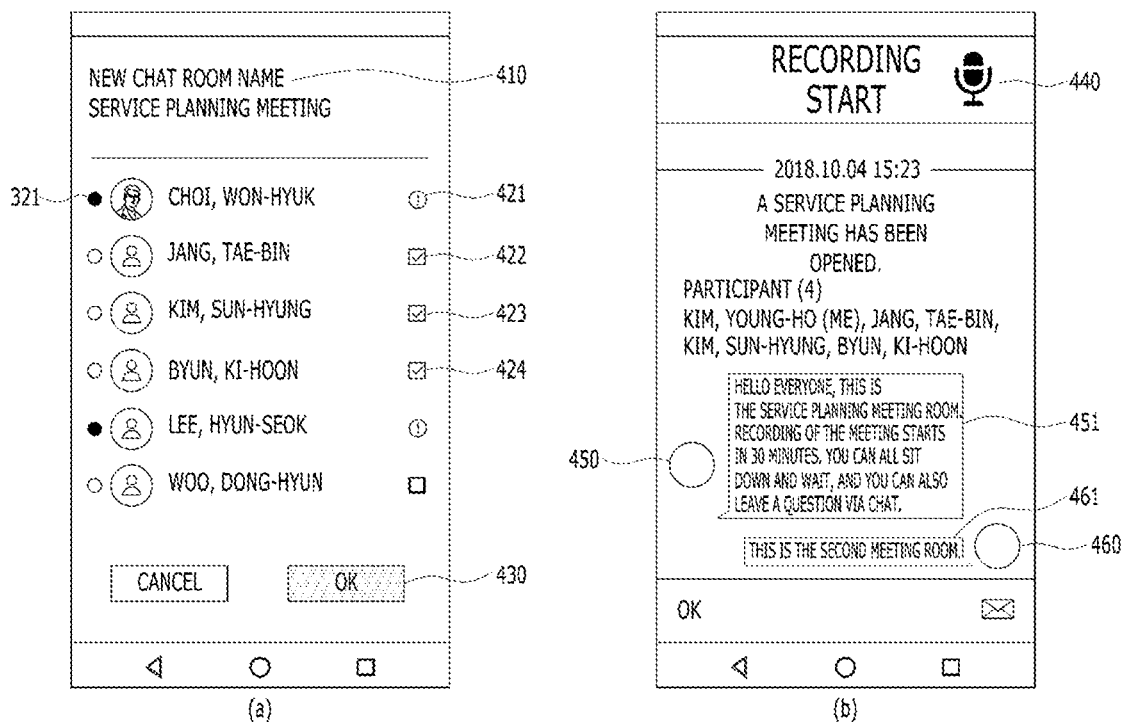
FIGS. 5A and 5B are diagrams illustrating examples of a user interface for a process of opening a chat room and a chat room including a plurality of users according to the embodiments of the present disclosure.

FIGS. 5A and 5B are diagrams illustrating examples of a user interface for a process of opening a chat room and a chat room including a plurality of users according to the embodiment of the present disclosure.

According to an embodiment of the present disclosure, the processor 110 may determine to transmit a control signal for providing a user selection input screen for including one or more other users in the chat room in response to the selection input of the user terminal 10 for the chat room open button 390 to the user terminal 10 (see FIGS. 4A and 4B). In this case, as illustrated in FIGS. 5A and 5B, the user selection input screen may display a list of one or more other users registered by the user, and may include a selection button for selecting the one or more other users corresponding to each of the one or more other users. For a more specific example, referring to FIG. 5, when the user wants to open a chat room including other users with IDs of "JANG, Tae-Bin," "KIM, Sun-Hyung," and "BYUN, Ki-Hoon" among the one or more other users registered by the user, the user may select and input selection buttons 422, 423, and 424 corresponding to "JANG, Tae-Bin", "KIM, Sun-Hyung," and "BYUN, Ki-Hoon," respectively, and select and input a button for selection completion. That is, the processor 110 may determine to transmit a control signal for opening a chat room in response to the selection inputs 422, 423, and 444 for the one or more other users through the user selection input screen from the user terminal and the selection input for an ok button 430 for the selection completion to the user terminal 10. The foregoing description is merely illustrative, and the present disclosure is not limited thereto.

When a new chat room between the user and one or more other users is opened, the processor 110 may determine to transmit a control signal for providing a chat room display screen to the user terminal. For example, when the processor 110 receives a selection input of the user terminal for one or more other users ("JANG, Tae-Bin," "KIM, Sun-Hyung," and "BYUN, Ki-Hoon") as illustrated in FIG. 5A, the processor 110 may provide a chat room display screen as illustrated in FIG. 5B. In this case, the chat room display screen may display information on the time point at which the chat room was opened, as illustrated in FIG. 5B, and display information about the users (for example, ID information of the users ("JANG, Tae-Bin," "KIM, Sun-Hyung," and "BYUN, Ki-Hoon") included in the chat room. The foregoing description is merely illustrative, and the present disclosure is not limited thereto.

The chat room display screen included in the user interface may include a recording start button 440 for receiving one or more voice data from each of the one or more users included in the chat room. In addition, when a selection input for the recording start button displayed on the chat room display screen is received from the user terminal, the processor 110 may receive one or more voice data from each of the one or more user terminals based on the time point at which the corresponding selection input is received.

The chat room display screen included in the user interface may sort and display the one or more voice recognition results generated based on the one or more voice data received from each of the one or more users included in the chat room by time and by speaker. The configuration of sorting and displaying the one or more voice recognition results generated based on the one or more voice data received from each user by time and by speaker has been described in detail with reference to FIG. 2, so that overlapping description will be omitted. The user interface may display the voice recognition result output based on the voice data received from the user's own terminal on one side of the chat room display screen, and display the voice recognition result output based on each voice data received from one or more other user terminals on the other side of the chat room display screen. For example, as illustrated in FIG. 5B, the voice recognition result output through the voice data of the specific user 450 may be arranged 451 on the left side of the chat room display screen in response to the specific user 450, and the voice recognition result output through the voice data of one or more other users 460 except for the specific user may be arranged 461 on the right side of the chat room display screen. That is, the user interface may provide convenience to the user by securing the readability of the text by displaying the conversation records between the plurality of users in the form of a chat window so that the user can easily recognize the contents of the conversation.

When the selection input for the specific conversation name among the one or more conversation names displayed on the conversation list display screen 350 is received from the user terminal, the processor 110 may determine to transmit a control signal for providing the conversation record display screen to the user terminal. A detailed description of the conversation record display screen will be described later with reference to FIGS. 6A and 6B.

Figures 6A, 6B:
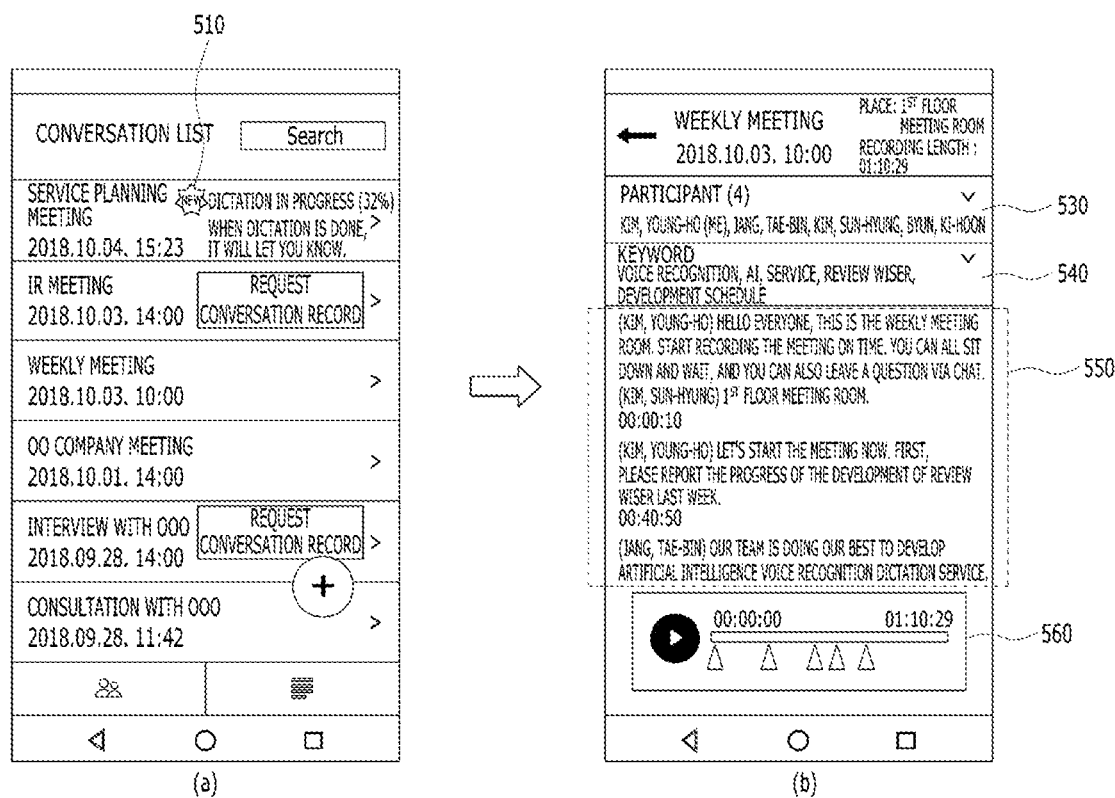
FIGS. 6A and 6B are diagrams illustrating an example of a user interface that provides a conversation record display screen in response to a selection input of a user terminal for a specific conversation among one or more conversation lists performed by a user according to the embodiment of the present disclosure.

FIGS. 6A and 6B are diagrams illustrating an example of a user interface that provides a conversation record display screen in response to a selection input of a user terminal for a specific conversation among one or more conversation lists performed by a user according to the embodiment of the present disclosure.

When a selection input for a specific conversation name among the one or more conversation names displayed on the conversation list display screen 350 included in the user interface is received from the user terminal, the processor 110 may determine to transmit a control signal for providing a conversation record display screen corresponding to the corresponding conversation name to the user terminal based on the selection input of the user terminal. As a specific example, as illustrated in FIG. 6A, a selection input 510 for a conversation name corresponding to 'service planning meeting' among the one or more conversation names displayed on the conversation list display screen is received from the user terminal 10, the processor 110 may transmit a control signal for providing a conversation record display screen corresponding "service planning meeting" to the user terminal 10. In this case, the conversation record display screen may include items as illustrated in FIG. 6B. More particularly, the conversation record display screen may include information 530 about each of the one or more users who conducted the conversation; Information 540 on one or more keywords related to the chat room, information 550 about the one or more voice recognition results sorted by time and by speaker, and a voice reproduction screen 560 for reproducing a voice section corresponding to the voice recognition result. The foregoing description is merely illustrative, and the present disclosure is not limited thereto.

When a selection input for at least one of the one or more keywords and the one or more voice recognition results displayed on the conversation record display screen 350 is received from the user terminal 10, the processor 110 may reproduce voice data corresponding to the corresponding selection input.

The reproduction of the voice data based on the selection input from the user terminal 10 for one or more keywords and one or more voice recognition results by the processor 110 will be described later in detail with reference to FIG. 7.

Figure 7:
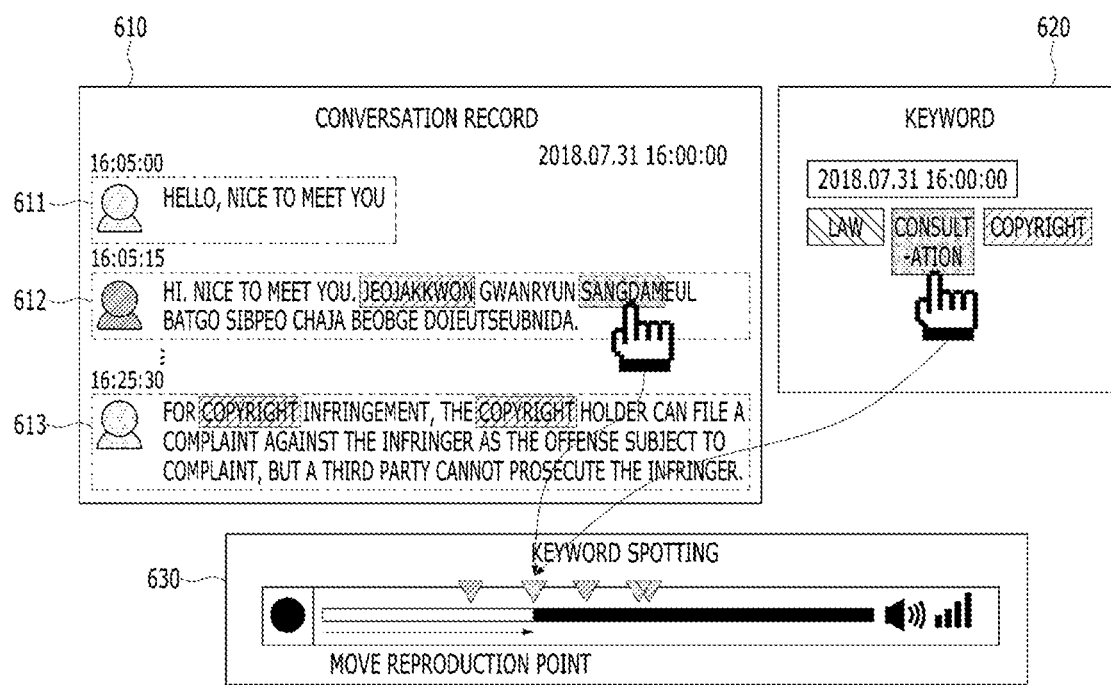
FIG. 7 is a diagram illustrating an example of a user interface in which a screen for reproducing a specific time point of voice data is displayed in response to a selection input of a user for a voice recognition result and a keyword according to the embodiment of the present disclosure.

FIG. 7 is a diagram illustrating an example of a user interface in which a screen for reproducing a specific time point of voice data is displayed in response to a selection input of a user for a voice recognition result and a keyword according to the embodiment of the present disclosure.

The user interface may display the one or more voice recognition results on the conversation record display screen, and the processor 110 may determine to transmit a control signal for providing a voice reproduction screen 630 for reproducing voice data at the time point of generating the corresponding voice recognition result in response to a selection input from the user terminal for at least one voice recognition result among the one or more voice recognition results to the user terminal 10. As a specific example, as illustrated in FIG. 7, the conversation record display screen may display the one or more voice recognition results as indicated by reference numerals 611, 612, and 613. In this case, when a selection input for reference number 612 is received from the user terminal 10, the processor 110 determines to transmit a control signal for providing a voice reproduction screen 630 for reproducing voice data sub-data having an utterance section of the voice data corresponding to the corresponding voice recognition result as a starting point to the user terminal 10. That is, the processor 110 may provide a conversation record including the one or more voice recognition results, and the processor 110 may reproduce, in the conversation record, the corresponding voice data sub-data in response to a selection input for a specific voice recognition result through the user terminal 10. Accordingly, the user may be provided with the conversation performed with one or more other users in both a text form and a voice form. In addition, since it is difficult to recognize the contents of a specific section of a voice file, the user is capable of quickly identifying a specific section in the conversation content through one or more voice recognition results (that is, text) displayed in the conversation record and reproducing the voice data sub-data corresponding to the corresponding specific section, thereby easily recognizing the contents of the conducted conversation.

The processor 110 may determine to transmit a control signal for providing the voice reproduction screen 630 for reproducing the voice data sub-data at the time point of generating the one or more voice recognition results matched with the corresponding keyword in response to the selection input form the user terminal 10 for the specific keyword among one or more keywords to the user terminal 10. In this case, the position of the one or more keywords may be identified in each of the one or more voice recognition results, and the specific keyword may be identified in the position of one or more voice recognition results among the one or more voice recognition results included in the conversation record. Accordingly, the processor 110 may display one or more identified positions of the keywords on the voice reproduction screen 630. For a more specific example, as illustrated in FIG. 7, when one or more keywords displayed on the conversation record display screen include "law," "consultation" and "copyright," and a selection input for specific "jeojakkwon" is received from the user terminal 10, the processor 110 may provide a control signal for providing the voice reproduction screen 630 for reproducing the voice data sub-data of the section corresponding to the corresponding keyword to the user terminal 10, and display one or more sections corresponding to "jeojakkwon" (that is, the keyword selected by the user) in the voice data on the voice reproduction screen 630. That is, the processor 110 may display each section (that is, voice data sub-data) in which the keyword exists on the voice reproduction screen 630 so that the user can easily search for the section corresponding to the specific keyword. Accordingly, the user can easily reproduce the section corresponding to the specific keyword in the voice data including the contents of the conversation performed with another user, thereby easily performing a search for specific contents.

According to the embodiment of the present disclosure, the user interface may include a text editing screen for receiving a correction request for one or more voice recognition results included in the conversation record from the user terminal. In addition, when the processor 110 receives a correction request for a specific voice recognition result among the one or more voice recognition results included in the conversation record from the user terminal 10, the processor 110 may correct the voice recognition model so that the voice recognition model outputs a voice recognition result corresponding to the corresponding voice recognition result. In this case, the voice recognition model may output a voice recognition result corresponding to each of the one or more voice data sub-data by using a speech to text (STT) algorithm. That is, the processor 110 may improve the performance of the STT algorithm by reflecting the feedback corresponding to the correction request for the voice recognition result received from the user terminal 10 to the STT algorithm.

According to the embodiment of the present disclosure, the memory 120 may store a program code executable on the processor 110, identification information for each of the one or more user terminals, information about the voice recognition model outputting the voice recognition result by using the voice data as an input, and information related to an algorithm related to natural language processing. For example, the memory 120 may store information on the correction request for correcting one or more voice recognition results received from the user terminal through the user interface.

According to the embodiment of the present disclosure, the memory 120 may include at least one type of storage medium among a flash memory type, a hard disk type, a multimedia card micro type, and the card type of memory (for example, an SD or XD memory), a Random Access Memory (RAM), a Static Random Access Memory (SRAM), a Read-Only Memory (ROM), an Electrically Erasable Programmable Read-only Memory (EEPROM), a Programmable Read-Only Memory (PROM), a magnetic memory, a magnetic disk, and an optical disk. The computing device 100 may also be operated in association with a web storage which performs a storage function of the memory 130 on the Internet. The description of the foregoing memory is merely an example, and the present disclosure is not limited thereto.

According to the embodiment of the present disclosure, the network unit 130 may transmit and receive information to and from one or more user terminals 10. Specifically, the network unit 130 may include a wired/wireless Internet module for network access. Wireless Internet technologies include Wireless LAN (WLAN), Wireless broadband (Wibro), World Interoperability for Microwave Access (Wimax), and High Speed Downlink Packet Access (HSDPA). Digital Subscriber Line (XDSL), FTTH (Fibers to the home), and PLC (Power Line Communication) may be used as wired Internet technologies.

In addition, the network unit 130 may include a short-range communication module, and may transmit and receive data to and from an electronic device including the short-range communication module, located relatively far from the user terminal. Short range communication technologies include Bluetooth, Radio Frequency Identification (RVID), Infrared Data Association (IRDA), Ultra Wideband (UWB), and ZigBee.

Figure 12:
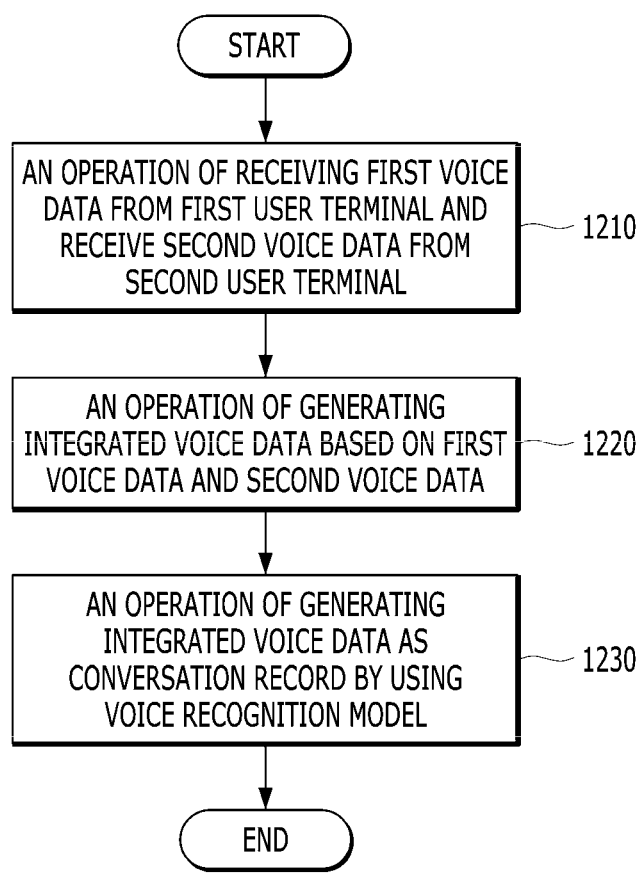
FIG. 12 is a block diagram illustrating a computing device for providing the conversation record service related to the embodiment of the present disclosure.

FIG. 12 is a flowchart illustrating a process of providing the conversation record service related to the embodiment of the present disclosure.

The computing device 100 may receive first voice data from a first user terminal and receive second voice data from a second user terminal (1210). The computing device 100 may perform pre-processing on each voice data in order to increase a recognition rate of integrated voice data. The pre-processing may include at least one of standardization of a signal size included in each of the one or more voice data or frequency filtering.

The computing device 100 may divide the first voice data into one or more first voice data sub-data based on an utterance section, and divide the second voice data into one or more second voice data sub-data based on an utterance section. In addition, the computing device 100 may identify a start time point and an end time point of each of the first voice data sub-data and the second voice data sub-data.

The computing device 100 may synchronize start time points and end time points of the first voice data and the second voice data through network packet exchange between the first user terminal and the second user terminal. Alternatively, the computing device 100 may synchronize start time points and end time points of the first voice data and the second voice data based on the similarity between the first voice data sub-data and the second voice data sub-data.

The computing device 100 may identify an overlapping section based on the start time point and the end time point of each of the first voice data sub-data and the second voice data sub-data.

The computing device 100 may divide a speaker based on a voice signal size of each of the first voice data and the second voice data. Alternatively, the computing device 100 may divide a speaker through a statistical acoustic model based on the first voice data and the second voice data. The computing device 100 may divide a speaker by comparing voice signal sizes of a first voice data frame based on the first voice data and a second voice data frame based on the second voice data.

The computing device 100 may divide a speaker of a current time point frame based on speaker information of an adjacent frame. The computing device 100 may divide a speaker based on an utterance time ratio of a speaker of each of the first voice data and the second voice data.

When the overlapping section is identified, the computing device 100 may divide the speakers by calculating an utterance time ratio for each speaker based on the speakers of the frame excluding the overlapping section. Alternatively, when the overlapping section is a frame after a predetermined time ratio, the computing device 100 may divide a speaker based on an utterance time ratio for each speaker for a previous frame of the overlapping section frame when identifying the overlapping section. That is, when the overlapping section is identified and the previous frame of the overlapping section is equal to or larger than the predetermined ratio of the voice data, the computing device 100 may perform a speaker separation on the overlapping section by referring to a speaker separation result for the previous frame. When the previous frame of the overlapping section is equal to or larger than the predetermined ratio of the voice data, the computing device 100 performs speaker separation for the overlapping section with reference to the speaker separation results for the previous frames, so that this may be utilized when the speaker separation results for the previous frames of the overlapping section have statistical significance.

The computing device 100 may generate integrated voice data based on the first voice data and the second voice data (1220).

The computing device 100 may generate the integrated voice data as a conversation record by using a voice recognition model (1230).

Figure 3:
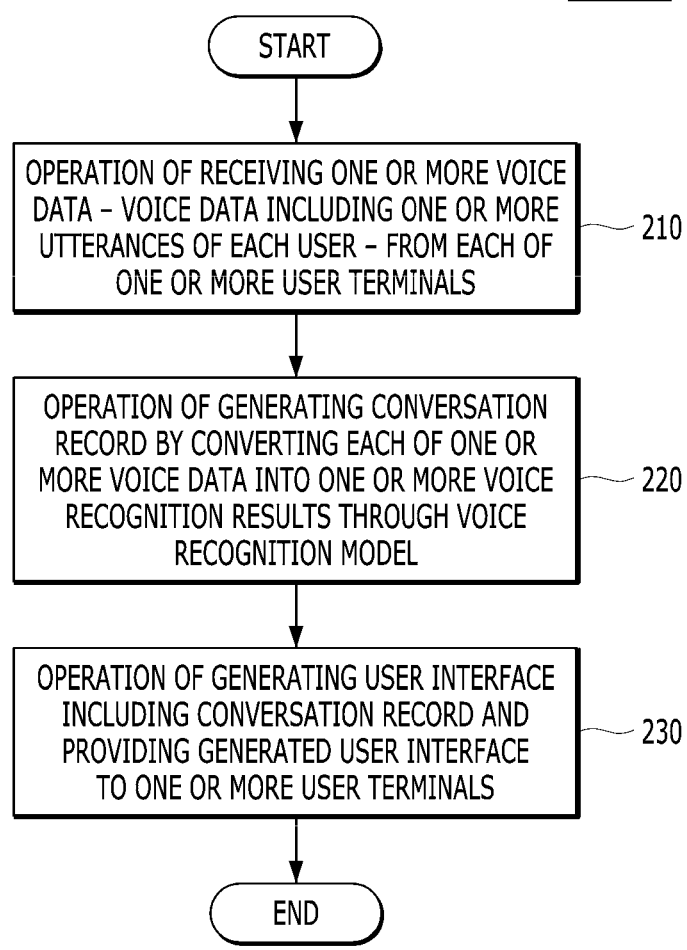
FIG. 3 is a flowchart for providing the conversation record service related to the embodiment of the present disclosure.

FIG. 3 is a flowchart for providing the conversation record service related to the embodiment of the present disclosure.

According to the embodiment of the present disclosure, the computing device 100 may receive one or more voice data, the voice data including one or more utterances for each user, from each of one or more user terminals (210). In this case, the voice data received by the computing device 100 is received from each of the one or more user terminals 10, and there may be one or more voice data.

According to the embodiment of the present disclosure, the computing device 100 may convert each of the one or more voice data into one or more voice recognition results through a voice recognition model to generate a conversation record (220).

The computing device 100 may identify one or more utterance sections for each of one or more voice data. The computing device 100 may identify one or more utterances included in the voice data. Specifically, the computing device 100 may identify an utterance section of the user based on one or more silence sections existing in the voice data. Also, the computing device 100 may divide the voice data into one or more voice data sub-data based on the utterance section.

The computing device 100 may identify the voice of each of one or more users in each of the one or more utterance sections included in the voice data. Also, the computing device 100 may determine an utterance having a size of the voice equal to or greater than a predetermined size among the identified voice of each of the one or more users as a specific speaker corresponding to the voice data. Also, the computing device 100 may match and store the specific speaker corresponding to the voice data with identification information of the user terminal.

The computing device 100 may assign a unified time point to each of the one or more voice data received from each of the one or more user terminals 10.

The computing device 100 may identify a start time point and an end time point of each of one or more voice data sub-data. Specifically, the computing device 100 may identify a start time point and an end time point of each of one or more voice data sub-data obtained by dividing the voice data based on the utterance section included in the voice data.

The computing device 100 may output one or more voice recognition sub-results corresponding to each of the one or more voice data sub-data by using each of the one or more voice data sub-data as an input of the voice recognition model. In this case, the voice recognition model is a model that converts the voice language spoken by the user into text data, and may include one or more network functions pre-trained through training data. In addition, the computing device 100 may determine the order of each of the one or more voice recognition sub-results on the conversation record based on the start time point and the end time point identified in each voice data sub-data that is the basis of the one or more voice recognition sub-results.

The computing device 100 may generate a conversation record based on the respective order of the one or more voice recognition sub-results.

According to an embodiment of the present disclosure, the computing device 100 may generate a user interface including the conversation record and provide the generated user interface to the one or more user terminals (230).

Figure 8:
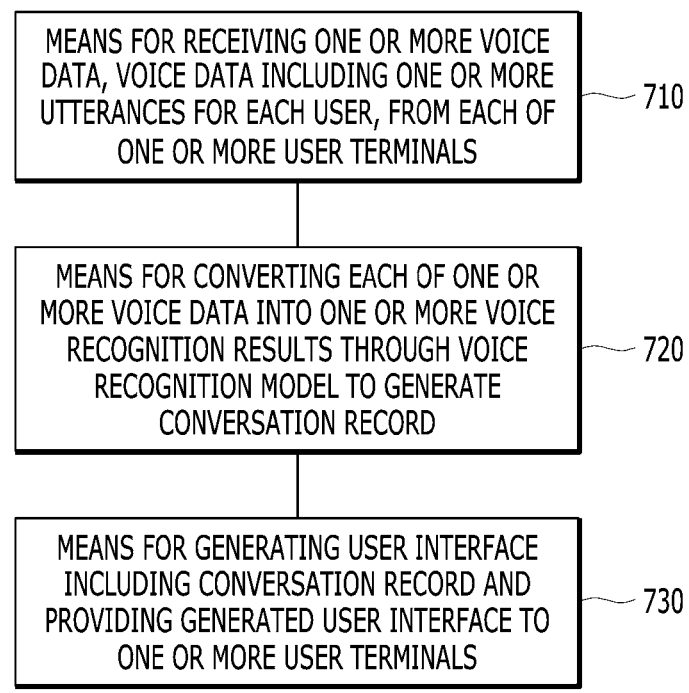
FIG. 8 is a diagram illustrating a means for providing a conversation record service related to the embodiment of the present disclosure.

FIG. 8 is a diagram illustrating a means for providing a conversation record service related to the embodiment of the present disclosure.

According to the embodiment of the present disclosure, in order to provide a conversation record service, the computing device 100 may include a means 710 for receiving one or more voice data, the voice data including one or more utterances for each user, from each of one or more user terminals, a means 720 for converting each of the one or more voice data into one or more voice recognition results through a voice recognition model to generate a conversation record, and a means 730 for generating a user interface including the conversation record and providing the generated user interface to the one or more user terminals.

Alternatively, the computing device 100 may further include a means for standardizing a size of a signal included in each of the one or more voice data based on a comparison of a size of a signal included in each of the one or more voice data with a size of a predetermined reference signal, and a means for removing at least one specific frequency by analyzing a frequency included in each of the one or more voice data.

Alternatively, the computing device 100 may further include a means for identifying one or more utterance sections based on the one or more silence sections included in the voice data and a means for separating a speaker based on a size of an utterance voice in the one or more utterance sections included in the voice data.

Alternatively, the means for separating the speaker based on the size of the utterance in the one or more utterance sections included in each of the one or more voice data may include a means for determining an utterance having an utterance voice size equal to or greater than a predetermined size among the one or more utterances included in the voice data as a specific speaker corresponding to the voice data, a means for removing other voice, except for the voice of the determined specific speaker, from the voice data, and a means for matching the specific speaker with identification information of the user terminal transmitting the voice data and storing the specific speaker.

Alternatively, the means for converting each of the one or more voice data into the one or more voice recognition results through the voice recognition model to generate the conversation record may include a means for dividing the voice data into one or more voice data sub-data based on the utterance section, a means for identifying a start time point and an end time point of each of the one or more voice data sub-data, a means for outputting one or more voice recognition sub-results corresponding to each of the one or more voice data sub-data by using each of the one or more voice data sub-data as an input to the voice recognition model, and a means for determining an order of each of the one or more voice recognition sub-results in the conversation record based on the start time point and the end time point identified in each of the voice data sub-data that is the basis of the one or more voice recognition sub-results.

Alternatively, the one or more voice data includes first voice data and second voice data received from each user terminal, and the means for converting each of the one or more voice data into the one or more voice recognition results through the voice recognition model to generate the conversation record may include a means for dividing the first voice data into one or more first voice data sub-data based on the utterance section, and dividing the second voice data into one or more second voice data sub-data based on the utterance section, a means for identifying a start time point and an end time point of each of the first voice data sub-data and the second voice data sub-data, a means for outputting one or more first voice recognition sub-results and one or more second voice recognition sub-results corresponding to the respective sub-data, respectively, by using the first voice data sub-data and the second voice data sub-data as inputs to the voice recognition model, a means for determining an order of each of the one or more first voice recognition sub-results and the one or more second voice recognition sub-results in the conversation record based on the start time point and the end time point identified in each of the voice data sub-data that is the basis of the one or more first voice recognition sub-results and the one or more second voice recognition sub-result, and a means for generating the conversation record based on the determined order and identification information of each of the one or more user terminals.

Alternatively, the means for outputting the one or more first voice recognition sub-results and the one or more second voice recognition sub-results corresponding to the sub-data, respectively, by using the first voice data sub-data and the second voice data sub-data as the inputs to the voice recognition model may include a means for identifying an overlapping section based on the start time point and the end time point of each of the first voice data sub-data and the second voice data sub-data, a means for determining whether to divide at least one of the first voice recognition sub-result and the second voice recognition sub-result corresponding to the overlapping section when the overlapping section is identified, and a means for dividing the voice recognition sub-result corresponding to the overlapping section when the division is determined.

Alternatively, the means for determining whether to divide at least one of the first voice recognition sub-result and the second voice recognition sub-result corresponding to the overlapping section when the overlapping section is identified may include a means for determining whether to divide the voice recognition result through a statistical language model with respect to the voice recognition result corresponding to the overlapping section.

Alternatively, the computing device 100 may further include a means for determining one or more keywords for the conversation record based on at least one of a semantic analysis result of the one or more voice recognition results, the number of times of the repetition for each word included in the one or more voice recognition results, and a predetermined conversation topic, and a means for identifying a location of each of the one or more keywords from the one or more voice recognition results.

Alternatively, the user interface may include a user list display screen displaying a user's profile, a list of one or more other users registered by the user, a registration request button for the user to register an additional user, and displaying whether each of the one or more other users accesses or not, and a conversation list display screen displaying information on a name of each of one or more conversations in which the user participated, a conversation search button for searching for a specific conversation among the one or more conversations, and a chat room open button for opening a chat room with one or more other users.

Alternatively, the computing device 100 may further include a means for determining to transmit a control signal for providing a user selection input screen to include the one or more other users in the chat room to the user terminal when a selection input for the chat room open button is received from user terminal.

Alternatively, the computing device 100 may further include a means for determining to transmit a control signal for providing a conversation record display screen including the conversation record corresponding to the specific chat room and one or more keywords to the user terminal when a selection input for a specific chat room from a list of one or more chat rooms in which the user has participated is received from the user terminal.

Alternatively, the computing device 100 may further include a means for determining to transmit a control signal for searching for a voice recognition result corresponding to a corresponding keyword, and providing a keyword reproduction screen for reproducing an utterance section of the voice data based on the generation of the searched voice recognition result to the user terminal when a selection input for a specific keyword among the one or more keywords is received from the user terminal.

Alternatively, the user interface may include a recording start button for receiving voice data from each of one or more users included in the chat room when a new chat room is opened, and a conversation record display screen displaying one or more voice recognition results generated based on the one or more voice data received from each of the one or more users included in the chat room.

Alternatively, the user interface includes a text editing screen for receiving a correction request for the one or more voice recognition results included in the conversation record from the user terminal, and the computing device 100 may further include a means for correcting the voice recognition model so that the voice recognition model outputs a voice recognition result corresponding to the correction request when the correction request for one or more voice recognition results included in the conversation record is received through the text editing screen from the user terminal.

Figure 9:
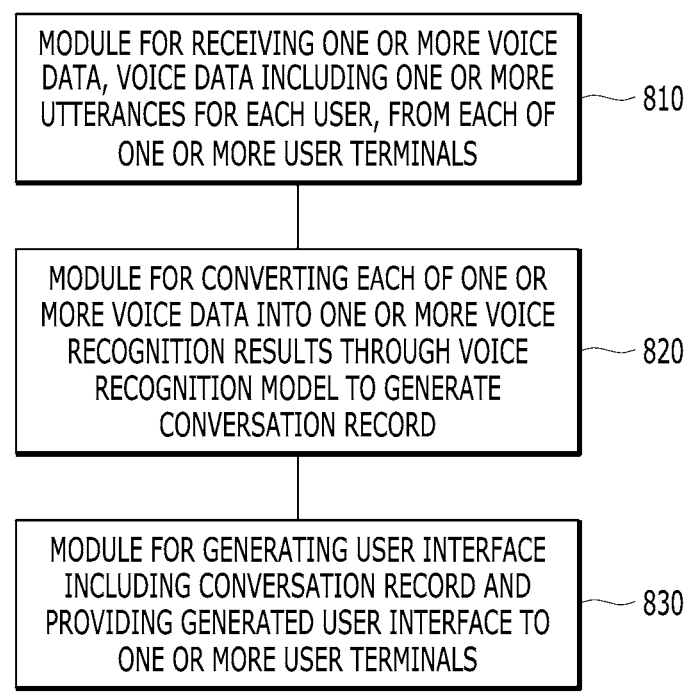
FIG. 9 is a diagram illustrating modules for providing the conversation record service related to the embodiment of the present disclosure.

FIG. 9 is a diagram illustrating modules for providing the conversation record service related to the embodiment of the present disclosure.

According to the embodiment of the present disclosure, in order to provide a conversation record service, the computing device 100 may include a module 810 for receiving one or more voice data, the voice data including one or more utterances for each user, from each of one or more user terminals, a module 820 for converting each of the one or more voice data into one or more voice recognition results through a voice recognition model to generate a conversation record, and a module 830 for generating a user interface including the conversation record and providing the generated user interface to the one or more user terminals.

Figure 10:
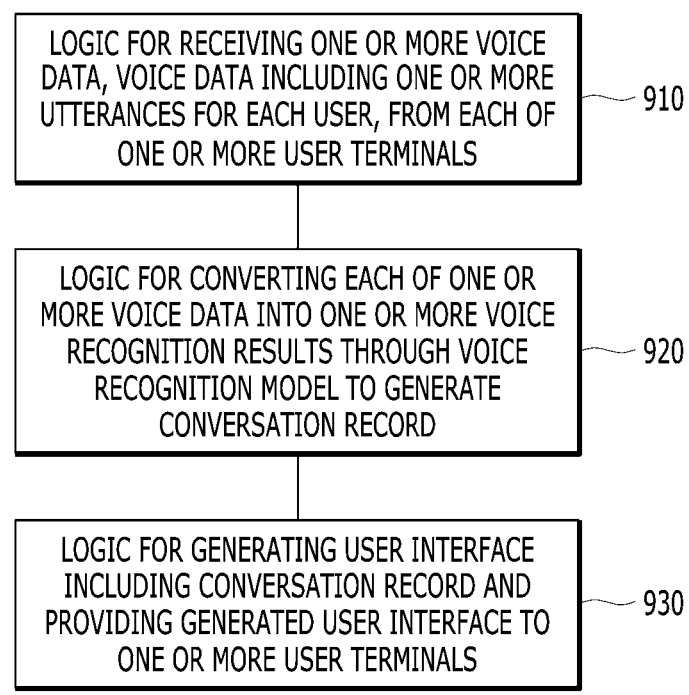
FIG. 10 is a diagram illustrating logic for providing the conversation record service related to the embodiment of the present disclosure.

FIG. 10 is a diagram illustrating logic for providing the conversation record service related to the embodiment of the present disclosure.

According to the embodiment of the present disclosure, in order to provide a conversation record service, the computing device 100 may include logic 910 for receiving one or more voice data, the voice data including one or more utterances for each user, from each of one or more user terminals, logic 920 for converting each of the one or more voice data into one or more voice recognition results through a voice recognition model to generate a conversation record, and logic 930 for generating a user interface including the conversation record and providing the generated user interface to the one or more user terminals.

Figure 11:
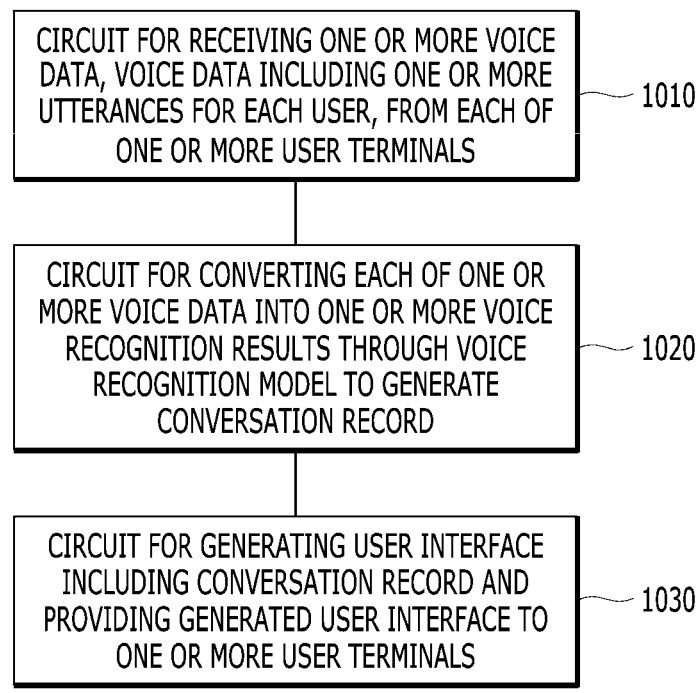
FIG. 11 is a diagram illustrating circuits for providing the conversation record service related to the embodiment of the present disclosure.

FIG. 11 is a diagram illustrating circuits for providing the conversation record service related to the embodiment of the present disclosure.

According to the embodiment of the present disclosure, in order to provide a conversation record service, the computing device 100 may include a circuit 1010 for receiving one or more voice data, the voice data including one or more utterances for each user, from each of one or more user terminals, a circuit 1020 for converting each of the one or more voice data into one or more voice recognition results through a voice recognition model to generate a conversation record, and a circuit 1030 for generating a user interface including the conversation record and providing the generated user interface to the one or more user terminals.

Those skilled in the art shall recognize that the various illustrative logical blocks, configurations, modules, circuits, means, logic, and algorithm operations described in relation to the embodiments additionally disclosed herein may be implemented by electronic hardware, computer software, or in a combination of electronic hardware and computer software. In order to clearly exemplify interchangeability of hardware and software, the various illustrative components, blocks, configurations, means, logic, modules, circuits, and operations have been generally described above in the functional aspects thereof. Whether the functionality is implemented as hardware or software depends on a specific application or design restraints given to the general system. Those skilled in the art may implement the functionality described by various methods for each of the specific applications. However, it shall not be construed that the determinations of the implementation deviate from the range of the contents of the present disclosure.

Figure 16:
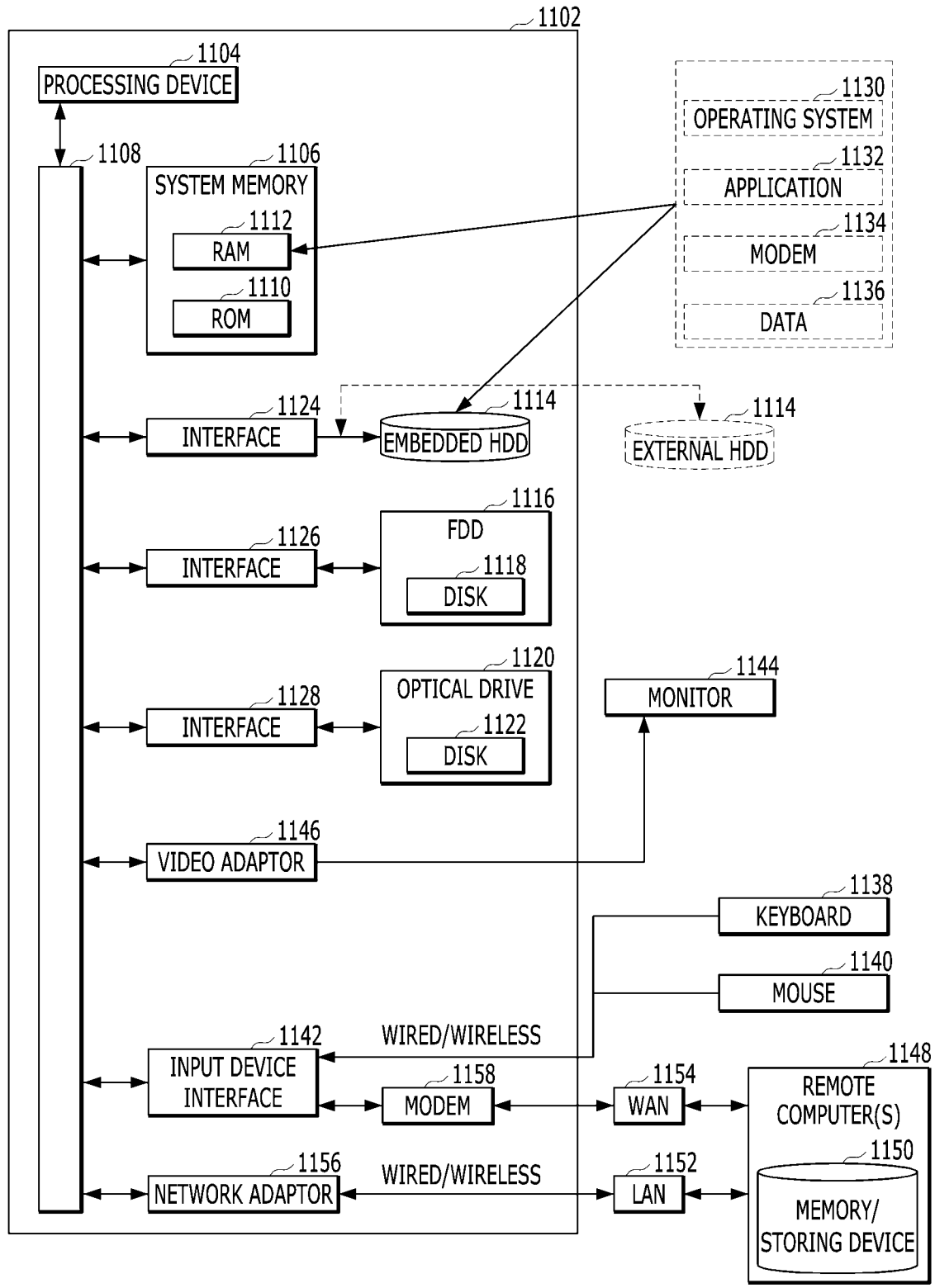
FIG. 16 is a simplified and general schematic diagram illustrating an example of a computing environment in which embodiments of the present disclosure may be implemented.

FIG. 16 is a simple and general diagram for an example of a computing environment in which the embodiments of the present disclosure may be implemented.

The present disclosure has been generally described in relation to a computer executable command executable in one or more computers, but those skilled in the art will appreciate well that the present disclosure is combined with other program modules and/or be implemented by a combination of hardware and software.

In general, a program module includes a routine, a program, a component, a data structure, and the like performing a specific task or implementing a specific abstract data type. Further, those skilled in the art will appreciate well that the method of the present disclosure may be carried out by a personal computer, a hand-held computing device, a microprocessor-based or programmable home appliance (each of which may be connected with one or more relevant devices and be operated), and other computer system configurations, as well as a single-processor or multiprocessor computer system, a mini computer, and a main frame computer.

The embodiments of the present disclosure may be carried out in a distribution computing environment, in which certain tasks are performed by remote processing devices connected through a communication network. In the distribution computing environment, a program module may be located in both a local memory storage device and a remote memory storage device.

The computer generally includes various computer readable media. A computer accessible medium may be a computer readable medium regardless of the kind of medium. The computer readable medium includes volatile and non-volatile media and transitory and non-transitory media, and portable and non-portable media. As a non-limited example, the computer readable medium may include a computer readable storage medium and a computer readable transport medium. The computer readable storage medium includes volatile and non-volatile media, transitory and non-non-transitory media, and portable and non-portable media constructed by a predetermined method or technology, which stores information, such as a computer readable command, a data structure, a program module, or other data. The computer storage medium includes a read only memory (RAM), a read only memory (ROM), electrically erasable and programmable ROM (EEPROM), a flash memory, or other memory technologies, a compact disc (CD)-ROM, a digital video disk (DVD), or other optical disk storage devices, a magnetic cassette, a magnetic tape, a magnetic disk storage device, or other magnetic storage device, or other predetermined media, which are accessible by a computer and are used for storing desired information, but is not limited thereto.

The computer readable transport medium generally includes all of the information transport media, such as other transport mechanisms, which implement a computer readable command, a data structure, a program module, or other data in a modulated data signal. The modulated data signal means a signal, of which one or more of the characteristics are set or changed so as to encode information within the signal. As a non-limited example, the computer readable transport medium includes a wired medium, such as a wired network or a direct-wired connection, and a wireless medium, such as sound, radio frequency (RF), infrared rays, and other wireless media. A combination of the predetermined media among the foregoing media is also included in a range of the computer readable transport medium.

An illustrative environment 1100 including a computer 1102 and implementing several aspects of the present disclosure is illustrated, and the computer 1102 includes a processing device 1104, a system memory 1106, and a system bus 1108. The system bus 1108 connects system components including the system memory 1106 (not limited thereto) to the processing device 1104. The processing device 1104 may be a predetermined processor among various common processors. A dual processor and other multi-processor architectures may also be used as the processing device 1104.

The system bus 1108 may be a predetermined one among several types of bus structure, which may be additionally connectable to a local bus using a predetermined one among a memory bus, a peripheral device bus, and various common bus architectures. The system memory 1106 includes a ROM 1110, and a RAM 1112. A basic input/output system (BIOS) is stored in a non-volatile memory 1110, such as a ROM, an erasable and programmable ROM (EPROM), and an EEPROM, and the BIOS includes a basic routine helping a transport of information among the constituent elements within the computer 1102 at a time, such as starting. The RAM 1112 may also include a high-rate RAM, such as a static RAM, for caching data.

The computer 1102 also includes an embedded hard disk drive (HDD) 1114 (for example, enhanced integrated drive electronics (EIDE) and serial advanced technology attachment (SATA))—the embedded HDD 1114 being configured for outer mounted usage within a proper chassis (not illustrated)—a magnetic floppy disk drive (FDD) 1116 (for example, which is for reading data from a portable diskette 1118 or recording data in the portable diskette 1118), and an optical disk drive 1120 (for example, which is for reading a CD-ROM disk 1122, or reading data from other high-capacity optical media, such as a DVD, or recording data in the high-capacity optical media). A hard disk drive 1114, a magnetic disk drive 1116, and an optical disk drive 1120 may be connected to a system bus 1108 by a hard disk drive interface 1124, a magnetic disk drive interface 1126, and an optical drive interface 1128, respectively. An interface 1124 for implementing an outer mounted drive includes at least one of or both a universal serial bus (USB) and the Institute of Electrical and Electronics Engineers (IEEE) 1394 interface technology.

The drives and the computer readable media associated with the drives provide non-volatile storage of data, data structures, computer executable commands, and the like. In the case of the computer 1102, the drive and the medium correspond to the storage of predetermined data in an appropriate digital form. In the description of the computer readable storage media, the HDD, the portable magnetic disk, and the portable optical media, such as a CD, or a DVD, are mentioned, but those skilled in the art will appreciate well that other types of computer readable storage media, such as a zip drive, a magnetic cassette, a flash memory card, and a cartridge, may also be used in the illustrative operation environment, and the predetermined medium may include computer executable commands for performing the methods of the present disclosure.

A plurality of program modules including an operation system 1130, one or more application programs 1132, other program modules 1134, and program data 1136 may be stored in the drive and the RAM 1112. An entirety or a part of the operation system, the application, the module, and/or data may also be cached in the RAM 1112. It will be appreciated that the present disclosure may be implemented by several commercially usable operation systems or a combination of operation systems.

A user may input a command and information to the computer 1102 through one or more wired/wireless input devices, for example, a keyboard 1138 and a pointing device, such as a mouse 1140. Other input devices (not illustrated) may include a microphone, an IR remote controller, a joystick, a game pad, a stylus pen, a touch screen, and the like. The foregoing and other input devices are frequently connected to the processing device 1104 through an input device interface 1142 connected to the system bus 1108, but may be connected by other interfaces, such as a parallel port, an IEEE 1394 serial port, a game port, a USB port, an IR interface, and other interfaces.

A monitor 1144 or other types of display devices are also connected to the system bus 1108 through an interface, such as a video adapter 1146. In addition to the monitor 1144, the computer generally includes other peripheral output devices (not illustrated), such as a speaker and a printer.

The computer 1102 may be operated in a networked environment by using a logical connection to one or more remote computers, such as remote computer(s) 1148, through wired and/or wireless communication. The remote computer(s) 1148 may be a workstation, a computing device computer, a router, a personal computer, a portable computer, a microprocessor-based entertainment device, a peer device, and other general network nodes, and generally includes some or an entirety of the constituent elements described for the computer 1102, but only a memory storage device 1150 is illustrated for simplicity. The illustrated logical connection includes a wired/wireless connection to a local area network (LAN) 1152 and/or a larger network, for example, a wide area network (WAN) 1154. The LAN and WAN networking environments are general in an office and a company, and make an enterprise-wide computer network, such as an Intranet, easy, and all of the LAN and WAN networking environments may be connected to a worldwide computer network, for example, Internet.

When the computer 1102 is used in the LAN networking environment, the computer 1102 is connected to the local network 1152 through a wired and/or wireless communication network interface or an adapter 1156. The adapter 1156 may make wired or wireless communication to the LAN 1152 easy, and the LAN 1152 may also include a wireless access point installed therein for the communication with the wireless adapter 1156. When the computer 1102 is used in the WAN networking environment, the computer 1102 may include a modem 1158, or includes other means connected to a communication computing device in the WAN 1154 or setting communication through the WAN 1154 via the Internet and the like. The modem 1158, which may be an embedded or outer-mounted and wired or wireless device, is connected to the system bus 1108 through a serial port interface 1142. In the networked environment, the program modules described for the computer 1102 or some of the program modules may be stored in a remote memory/storage device 1150. The illustrated network connection is illustrative, and those skilled in the art will appreciate well that other means setting a communication link between the computers may be used.

The computer 1102 performs an operation of communicating with a predetermined wireless device or entity, for example, a printer, a scanner, a desktop and/or portable computer, a portable data assistant (PDA), a communication satellite, predetermined equipment or place related to a wirelessly detectable tag, and a telephone, which is disposed by wireless communication and is operated. The operation includes a wireless fidelity (Wi-Fi) and Bluetooth wireless technology at least. Accordingly, the communication may have a pre-defined structure, such as a network in the related art, or may be simply ad hoc communication between at least two devices.

The Wi-Fi enables a connection to the Internet and the like even without a wire. The Wi-Fi is a wireless technology, such as a cellular phone, which enables the device, for example, the computer, to transmit and receive data indoors and outdoors, that is, in any place within a communication range of a base station. A Wi-Fi network uses a wireless technology, which is called IEEE 802.11 (a, b, g, etc.) for providing a safe, reliable, and high-rate wireless connection. The Wi-Fi may be used for connecting to the computer, the Internet, and the wired network (IEEE 802.3 or Ethernet is used). The Wi-Fi network may be operated at, for example, a data rate of 11 Mbps (802.11a) or 54 Mbps (802.11b) in an unauthorized 2.4 and 5 GHz wireless band, or may be operated in a product including both bands (dual bands).

Those skilled in the art may appreciate that information and signals may be expressed by using predetermined various different technologies and techniques. For example, data, indications, commands, information, signals, bits, symbols, and chips referable in the foregoing description may be expressed with voltages, currents, electromagnetic waves, electromagnetic fields or particles, optical fields or particles, or a predetermined combination thereof.

Those skilled in the art will appreciate that the various illustrative logical blocks, modules, processors, means, circuits, and algorithm operations described in relation to the embodiments disclosed herein may be implemented by electronic hardware (for convenience, called "software" herein), various forms of program or design code, or a combination thereof. In order to clearly describe compatibility of the hardware and the software, various illustrative components, blocks, modules, circuits, and operations are generally illustrated above in relation to the functions of the hardware and the software. Whether the function is implemented as hardware or software depends on design limits given to a specific application or an entire system. Those skilled in the art may perform the function described by various schemes for each specific application, but it shall not be construed that the determinations of the performance depart from the scope of the present disclosure.

Various embodiments presented herein may be implemented by a method, a device, or a manufactured article using a standard programming and/or engineering technology. A term "manufactured article" includes a computer program or a medium accessible from a predetermined computer-readable device. For example, the computer-readable medium includes a magnetic storage device (for example, a hard disk, a floppy disk, and a magnetic strip), an optical disk (for example, a CD and a DVD), a smart card, and a flash memory device (for example, an EEPROM, a card, a stick, and a key drive), but is not limited thereto. Further, various storage media presented herein include one or more devices and/or other machine-readable media for storing information.

It shall be understood that a specific order or a hierarchical structure of the operations included in the presented processes is an example of illustrative accesses. It shall be understood that a specific order or a hierarchical structure of the operations included in the processes may be re-arranged within the scope of the present disclosure based on design priorities. The accompanying method claims provide various operations of elements in a sample order, but it does not mean that the claims are limited to the presented specific order or hierarchical structure.

The description of the presented embodiments is provided so as for those skilled in the art to use or carry out the present disclosure. Various modifications of the embodiments will be apparent to those skilled in the art. General principles defined herein may be applied to other embodiments without departing from the scope of the present disclosure. Accordingly, the present disclosure is not limited to the embodiments suggested herein, and shall be interpreted within the broadest meaning range consistent to the principles and new characteristics suggested herein.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A non-transitory computer-readable storage medium storing a computer program executable by one or more processors, the computer program causing the one or more processors to perform one or more operations below, the operations comprising:
   an operation of receiving first voice data from a first user terminal and receiving second voice data from a second user terminal;
   an operation of generating integrated voice data by using a method of dividing a speaker based on a speaker utterance time ratio of the first voice data and the second voice data; and
   an operation of generating the integrated voice data as a conversation record by using a voice recognition model,
   wherein the method of dividing the speaker based on the speaker utterance time ratio of the first voice data and the second voice data includes at least one of:
   an operation of calculating an utterance time ratio for each speaker based on a speaker of a frame excluding an overlapping section to divide the speakers for the overlapping section when the overlapping section is identified; and
   an operation of dividing the speaker of the overlapping section based on an utterance time ratio for each speaker for a previous frame of an overlapping section frame when the overlapping section is identified, and
   wherein the operation of dividing the speaker of the overlapping section based on an utterance time ratio for each speaker for a previous frame of an overlapping section frame when the overlapping section is identified is performed when the precious frame of the overlapping section frame is equal to or greater than a selected ratio of voice data.

2. The non-transitory computer-readable storage medium of claim 1, wherein the operations further comprise:
   an operation of dividing the first voice data into one or more first voice data sub-data based on an utterance section, and dividing the second voice data into one or more second voice data sub-data based on an utterance section; and
   an operation of identifying a start time point and an end time point of each of the first voice data sub-data and the second voice data sub-data.

3. The non-transitory computer-readable storage medium of claim 2, wherein the operation of identifying the start time point and the end time point of each of the first voice data sub-data and the second voice data sub-data includes at least one of:
   an operation of synchronizing the start time points and the end time points of the first voice data and the second voice data through network packet exchange between the first user terminal and the second user terminal; and
   an operation of synchronizing the start time points and the end time points of the first voice data and the second voice data based on similarity of the first voice data sub-data and the second voice data sub-data.

4. The non-transitory computer-readable storage medium of claim 1, wherein the operations further comprise an operation of identifying an overlapping section based on a start time point and an end time point of each of the first voice data sub-data and the second voice data sub-data.

5. The non-transitory computer-readable storage medium of claim 1, wherein the operation of receiving the first voice data from the first user terminal and receiving the second voice data from the second user terminal includes an operation of performing pre-processing on each voice data in order to increase a recognition rate of the integrated voice data, and
 the pre-processing includes at least one of standardization of a signal size included in each of one or more voice data or frequency filtering.

6. The non-transitory computer-readable storage medium of claim 1, wherein the operation of generating the integrated voice data includes an operation of generating the integrated voice data by additionally using at least one of:
 a method of dividing a speaker based on a voice signal size of each of the first voice data and the second voice data; and
 a method of dividing a speaker through a statistical acoustic model based on the first voice data and the second voice data.

7. The non-transitory computer-readable storage medium of claim 6, wherein the method of dividing the speaker based on the voice signal size of each of the first voice data and the second voice data includes
 an operation of dividing a speaker by comparing voice signal sizes of a first voice data frame based on the first voice data and a second voice data frame based on the second voice data.

8. The non-transitory computer-readable storage medium of claim 6, wherein the method of dividing the speaker through the statistical acoustic model includes an operation of dividing a speaker of a current time point frame based on speaker information of an adjacent frame.

9. A method for providing a conversation record service, the method comprising:
 receiving first voice data from a first user terminal and receiving second voice data from a second user terminal;
 generating integrated voice data by using a method of dividing a speaker based on a speaker utterance time ratio of the first voice data and the second voice data; and
 generating the integrated voice data as a conversation record by using a voice recognition model,
 wherein the method of dividing the speaker based on the speaker utterance time ratio of the first voice data and the second voice data includes at least one of:
 calculating an utterance time ratio for each speaker based on a speaker of a frame excluding an overlapping section to divide the speakers for the overlapping section when the overlapping section is identified; and
 dividing the speaker of the overlapping section based on an utterance time ratio for each speaker for a previous frame an overlapping section frame when the overlapping section is identified, and
 wherein the dividing the speaker of the overlapping section based on an utterance time ratio for each speaker for a previous frame of an overlapping section frame when the overlapping section is identified is performed when the previous frame of the overlapping section frame is equal to or greater than a selected ratio of voice data.

10. The method of claim 9, further comprising:
 dividing the first voice data into one or more first voice data sub-data based on an utterance section, and dividing the second voice data into one or more second voice data sub-data based on an utterance section; and
 identifying a start time point and an end time point of each of the first voice data sub-data and the second voice data sub-data.

11. The method of claim 10, wherein identifying the start time point and the end time point of each of the first voice data sub-data and the second voice data sub-data includes at least one of:
 synchronizing the start time points and the end time points of the first voice data and the second voice data through network packet exchange between the first user terminal and the second user terminal; and
 synchronizing the start time points and the end time points of the first voice data and the second voice data based on similarity of the first voice data sub-data and the second voice data sub-data.

12. The method of claim 9, further comprising: identifying an overlapping section based on a start time point and an end time point of each of the first voice data sub-data and the second voice data sub-data.

13. The method of claim 9, wherein receiving the first voice data from the first user terminal and receiving the second voice data from the second user terminal includes performing pre-processing on each voice data in order to increase a recognition rate of the integrated voice data, and
 wherein the pre-processing includes at least one of standardization of a signal size included in each of one or more voice data or frequency filtering.

14. The method of claim 9, wherein generating the integrated voice data includes generating the integrated voice data by additionally using at least one of:
 a method of dividing a speaker based on a voice signal size of each of the first voice data and the second voice data; and
 a method of dividing a speaker through a statistical acoustic model based on the first voice data and the second voice data.

15. The method of claim 14, wherein the method of dividing the speaker based on the voice signal size of each of the first voice data and the second voice data includes
 dividing a speaker by comparing voice signal sizes of a first voice data frame based on the first voice data and a second voice data frame based on the second voice data.

16. The method of claim 14, wherein the method of dividing the speaker through the statistical acoustic model includes dividing a speaker of a current time point frame based on speaker information of an adjacent frame.

17. A server for providing a conversation record service, the server comprising:
 a server processor including one or more cores;
 a server memory for storing program codes executable in the server processor; and
 a server network unit for transceiving data with one or more user terminals,
 wherein the processor is configured to:
 receive first voice data from a first user terminal and receiving second voice data from a second user terminal,
 generate integrated voice data by using a method of dividing a speaker based on a speaker utterance time ratio of the first voice data and the second voice data, and generate the integrated voice data as a conversation record by using a voice recognition model, wherein the method of dividing the speaker based on the speaker utterance time ratio of the first voice data and the second voice data includes at least one of:

calculating an utterance time ratio for each speaker based on a speaker of a frame excluding an overlapping section to divide the speakers for the overlapping section when the overlapping section is identified; and dividing the speaker of the overlapping section based on an utterance time ratio for each speaker for a previous frame of an overlapping section frame when the overlapping section is identified, and wherein the dividing the speaker of the overlapping section based on an utterance time ratio for each speaker for a previous frame of an overlapping section frame when the overlapping section is identified is performed when the previous frame of the overlapping section frame is equal to or greater than a selected ratio of voice data.

* * * * *